United States Patent
Wu

(10) Patent No.: US 12,514,470 B2
(45) Date of Patent: Jan. 6, 2026

(54) BIOSENSOR WITH MEMBRANE STRUCTURE FOR STEADY-STATE AND NON-STEADY-STATE CONDITIONS FOR DETERMINING ANALYTE CONCENTRATIONS

(71) Applicant: Ascensia Diabetes Care Holdings AG, Basel (CH)

(72) Inventor: Huan-Ping Wu, Granger, IN (US)

(73) Assignee: Ascensia Diabetes Care Holdings AG, Basel (CH)

( * ) Notice: Subject to any disclaimer, the term of this patent is extended or adjusted under 35 U.S.C. 154(b) by 0 days.

(21) Appl. No.: 17/394,191

(22) Filed: Aug. 4, 2021

(65) Prior Publication Data

US 2022/0039709 A1   Feb. 10, 2022

Related U.S. Application Data

(60) Provisional application No. 63/061,167, filed on Aug. 4, 2020, provisional application No. 63/061,157, filed
(Continued)

(51) Int. Cl.
*G16H 40/67* (2018.01)
*A61B 5/00* (2006.01)
(Continued)

(52) U.S. Cl.
CPC ........ *A61B 5/14532* (2013.01); *A61B 5/0002* (2013.01); *A61B 5/1451* (2013.01);
(Continued)

(58) Field of Classification Search
CPC . A61B 5/14532; A61B 5/1451; A61B 5/1486; A61B 5/6801; A61B 5/72;
(Continued)

(56) References Cited

U.S. PATENT DOCUMENTS

| | | |
|---|---|---|
| 2005/0143635 A1 | 6/2005 | Kamath et al. |
| 2005/0161346 A1 | 7/2005 | Simpson et al. |

(Continued)

FOREIGN PATENT DOCUMENTS

| | | |
|---|---|---|
| CN | 109790562 A | 5/2019 |
| JP | 2007108171 A | 4/2007 |

(Continued)

OTHER PUBLICATIONS

U.S. Appl. No. 17/394,290, filed Aug. 4, 2021, Wu et al.
(Continued)

*Primary Examiner* — Alex M Valvis
*Assistant Examiner* — Grace L Rozanski
(74) *Attorney, Agent, or Firm* — Erise IP, P.A.

(57) ABSTRACT

A biosensor system is configured to establish a steady-state condition and alternate between the steady-state condition and a non-steady-state condition to determine an analyte concentration. The biosensor system includes an electrode system having at least one working electrode and one counter electrode. The working electrode is covered with an analyte catalyzing layer for converting an analyte into measurable species. A membrane system encompasses the electrode system and comprises an analyte permeable membrane. The membrane has an analyte permeability with lower analyte solubility than an analyte solubility outside the membrane. The membrane is configured to trap a measureable species within the membrane such that a steady-state of the measurable species resulting from the analyte is established near the electrode surface. A bias circuit is configured to apply a potential modulation sequence to the working electrode to cause alternating of steady-state and non-steady-state conditions within the electrode system for analyte concentration determination.

20 Claims, 14 Drawing Sheets

Related U.S. Application Data on Aug. 4, 2020, provisional application No. 63/061,152, filed on Aug. 4, 2020, provisional application No. 63/061,135, filed on Aug. 4, 2020.

(51) Int. Cl.
  A61B 5/145     (2006.01)
  A61B 5/1486    (2006.01)
  A61B 5/1495    (2006.01)
  G01N 33/487    (2006.01)
  G01N 33/49     (2006.01)
  G16H 40/40     (2018.01)
  G16H 50/30     (2018.01)
  G16H 50/70     (2018.01)

(52) U.S. Cl.
  CPC .......... *A61B 5/1486* (2013.01); *A61B 5/6801* (2013.01); *A61B 5/72* (2013.01); *A61B 5/7228* (2013.01); *G01N 33/48707* (2013.01); *G01N 33/49* (2013.01); *G16H 40/67* (2018.01); *A61B 5/14865* (2013.01); *A61B 5/1495* (2013.01); *A61B 2560/0223* (2013.01); *G16H 40/40* (2018.01); *G16H 50/30* (2018.01); *G16H 50/70* (2018.01)

(58) Field of Classification Search
  CPC . A61B 5/7228; A61B 5/14865; A61B 5/1495; A61B 2560/0223; G16H 40/67; G16H 40/40; G16H 50/30; G16H 50/70; G01N 33/48707; G01N 33/49
  See application file for complete search history.

(56) References Cited

U.S. PATENT DOCUMENTS

| | | |
|---|---|---|
| 2005/0245799 A1 | 11/2005 | Brauker et al. |
| 2010/0270178 A1 | 10/2010 | Guo et al. |
| 2012/0283538 A1 | 11/2012 | Rose et al. |
| 2013/0186755 A1* | 7/2013 | Chu .................. G01N 27/3272 204/403.14 |
| 2013/0245401 A1 | 9/2013 | Estes et al. |
| 2016/0077037 A1* | 3/2016 | Cha ................... G01N 27/3274 205/777.5 |
| 2018/0306744 A1* | 10/2018 | Malecha ............ G01N 33/5438 |
| 2019/0125225 A1 | 5/2019 | Rebec et al. |
| 2019/0346399 A1 | 11/2019 | Wu |
| 2019/0357827 A1* | 11/2019 | Li ...................... A61B 5/14503 |
| 2020/0029876 A1 | 1/2020 | Brister et al. |
| 2020/0205701 A1 | 7/2020 | Bohm et al. |
| 2020/0245910 A1* | 8/2020 | Mallas ................. A61B 5/686 |

FOREIGN PATENT DOCUMENTS

| | | |
|---|---|---|
| JP | 2008506468 A | 3/2008 |
| WO | WO2018104835 A1 | 6/2018 |
| WO | WO2020161099 A1 | 8/2020 |

OTHER PUBLICATIONS

U.S. Appl. No. 17/394,279, filed Aug. 4, 2021, Wu et al.
U.S. Appl. No. 17/394,209, filed Aug. 4, 2021, Wu et al.
International Search Report & Written Opinion of International Application No. PCT/EP2021/071744 mailed Dec. 1, 2021.
Taiwan Patent Application 110128657 First Office Action issued Nov. 7, 2024.
European Patent Application 21763244.7, Office Action, issued Apr. 1, 2025.
Japanese Patent Application 2023-507400, First Office Action, issued Apr. 1, 2025.
Chinese Patent Application 202180056969.9, Office Action, issued Aug. 29, 2025.

* cited by examiner

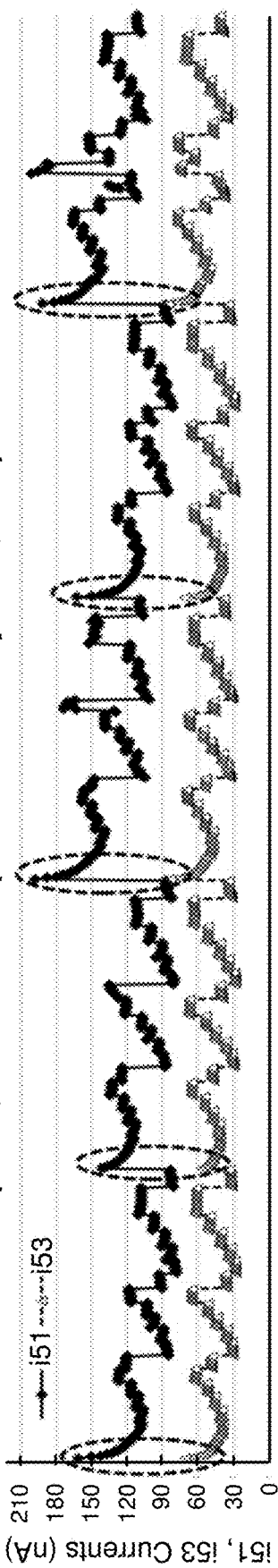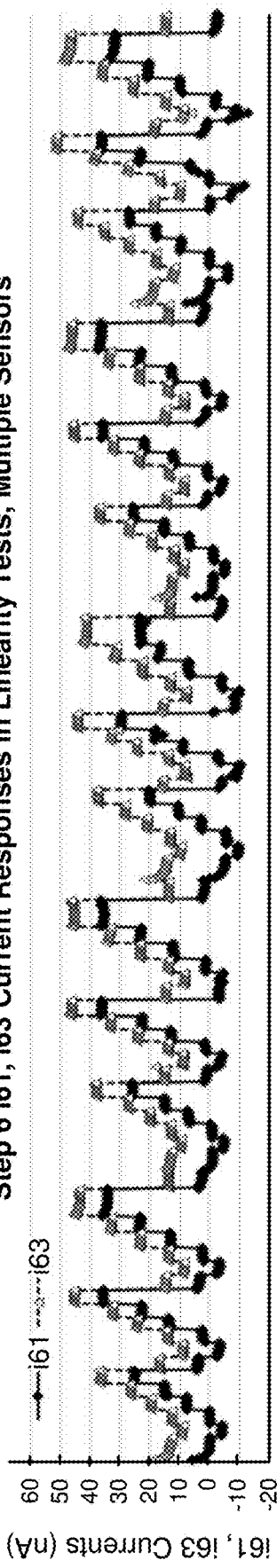
FIG. 2E
FIG. 2F

| Indicators | | $G_{raw}$ | | $G_{comp}$ | | | | | |
|---|---|---|---|---|---|---|---|---|---|
| | | %-bias | %-MARD | %-bias | %-MARD | ±10% | ±12.5% | ±15% | ±20% |
| i10 (lw-lb) | Mean | -10.67 | 20.17 | 0.12 | 3.75 | 94.6 | 97.3 | 98.5 | 99.8 |
| | SD | 21.11 | | 5.05 | | | | | |
| R4 | Mean | 3.43 | 27.80 | 0.19 | 3.99 | 92.6 | 96.4 | 97.9 | 99.3 |
| | SD | 33.03 | | 5.57 | | | | | |
| y45 | Mean | 3.73 | 28.43 | -0.25 | 4.14 | 91.8 | 95.0 | 96.9 | 98.8 |
| | SD | 33.80 | | 5.91 | | | | | |
| R1 | Mean | 1.96 | 19.47 | 0.26 | 3.93 | 93.1 | 96.2 | 97.7 | 99.5 |
| | SD | 25.86 | | 5.69 | | | | | |

*FIG. 6*

BIOSENSOR WITH MEMBRANE STRUCTURE FOR STEADY-STATE AND NON-STEADY-STATE CONDITIONS FOR DETERMINING ANALYTE CONCENTRATIONS

CROSS REFERENCE TO RELATED APPLICATION

This claims the benefit of U.S. Provisional Patent Application No. 63/061,135, filed Aug. 4, 2020 and titled "CONTINUOUS ANALYTE MONITORING SENSOR CALIBRATION AND MEASUREMENTS BY A CONNECTION FUNCTION," U.S. Provisional Patent Application No. 63/061,152, filed Aug. 4, 2020 and titled "NON-STEADY-STATE DETERMINATION OF ANALYTE CONCENTRATION FOR CONTINUOUS GLUCOSE MONITORING BY POTENTIAL MODULATION," U.S. Provisional Patent Application No. 63/061,157, filed Aug. 4, 2020 and titled "EXTRACTING PARAMETERS FOR ANALYTE CONCENTRATION DETERMINATION," and U.S. Provisional Patent Application No. 63/061,167, filed Aug. 4, 2020 and titled "BIOSENSOR WITH MEMBRANE STRUCTURE FOR STEADY-STATE AND NON-STEADY-STATE CONDITIONS FOR DETERMINING ANALYTE CONCENTRATIONS," each disclosure of which is hereby incorporated by reference herein in its entirety for all purposes.

FIELD

The invention relates generally to continuous sensor monitoring of an analyte in a bodily fluid and, more particularly, to continuous glucose monitoring (CGM).

BACKGROUND

Continuous analyte sensing in an in-vivo or in-vitro sample, such as, e.g., CGM, has become a routine sensing operation in the field of medical devices, and more specifically, in diabetes care. For biosensors that measure analytes in a whole blood sample with discrete sensing, such as, e.g., pricking a finger to obtain a blood sample, the sample's temperature and hematocrit of the blood sample may be major sources of error. However, for sensors deployed in a non-whole blood environment with relatively constant temperatures, such as sensors used in a continuous in-vivo sensing operation, other sensor error sources may exist.

Accordingly, improved apparatus and methods for determining glucose values with CGM sensors are desired.

SUMMARY

In some embodiments, a biosensor system is configured to establish a steady-state condition and alternate between the steady-state condition and a non-steady-state condition to determine an analyte concentration. The biosensor system includes an electrode system having at least one working electrode and one counter electrode, wherein the working electrode is covered with an analyte catalyzing layer for converting an analyte into measurable species at and near the working electrode. The biosensor system also includes a membrane system encompassing the electrode system and comprising an analyte permeable membrane. The analyte permeable membrane has an analyte permeability with lower analyte solubility than an analyte solubility outside the membrane. The membrane is configured to trap a measurable species within the membrane such that a steady-state of the measurable species resulting from the analyte is established near the electrode surface. The biosensor system further includes a bias circuit configured to apply a potential modulation sequence to the working electrode to cause alternating of steady-state and non-steady-state conditions within the electrode system for analyte concentration determination. The biosensor system further includes a processor and a memory coupled to the processor. The memory includes computer program code stored therein that, when executed by the processor, causes the processor to (a) measure and store a primary current signal using the working electrode and memory; (b) measure and store a plurality of probing potential modulation current signals associated with the primary current signal; (c) determine an initial glucose concentration based on a conversion function and a measured current signal; (d) determine a connection function value based on the primary current signal and a plurality of the probing potential modulation current signals; and (e) determine a final glucose concentration based on the initial glucose concentration and the connection function value.

In some embodiments, a method of determining glucose values during continuous glucose monitoring (CGM) measurements includes providing a CGM device. The CGM device includes a sensor, a memory, and a processor. The sensor comprises an electrode system and a membrane system encompassing the electrode system, wherein the membrane system comprises an analyte permeable membrane having an analyte permeability with lower analyte solubility than an analyte solubility outside the membrane. The method also includes: applying a constant voltage potential to the sensor; measuring a primary current signal resulting from the constant voltage potential and storing the measured primary current signal in the memory; applying a probing potential modulation sequence to the sensor; measuring probing potential modulation current signals resulting from the probing potential modulation sequence and storing measured probing potential modulation current signals in the memory; determining an initial glucose concentration based on a conversion function and a ratio of measured probing potential modulation current signals; determining a connection function value based on the primary current signal and a plurality of the probing potential modulation current signals; and determining a final glucose concentration based on the initial glucose concentration and the connection function value.

Still other aspects, features, and advantages of this disclosure may be readily apparent from the following detailed description and illustration of a number of example embodiments and implementations, including the best mode contemplated for carrying out the invention. This disclosure may also be capable of other and different embodiments, and its several details may be modified in various respects, all without departing from the scope of the invention. For example, although the description below is related to continuous glucose monitoring, the devices, systems, and methods described below may be readily adapted to monitoring other analytes, such as, e.g., cholesterol, lactate, uric acid, alcohol, or the like, in other continuous analyte monitoring systems.

BRIEF DESCRIPTION OF DRAWINGS

The drawings, described below, are for illustrative purposes and are not necessarily drawn to scale. Accordingly, the drawings and descriptions are to be regarded as illus

FIGS. 2A-F illustrate graphs of initial and ending currents in a respective potential step from sensors in in-vitro linearity tests according to one or more embodiments of the disclosure; in particular, FIG. 2A illustrates a graph of initial and ending currents in potential step 1 of FIG. 1C; FIG. 2B illustrates a graph of initial and ending currents in potential step 2 of FIG. 1C; FIG. 2C illustrates a graph of initial and ending currents in potential step 3 of FIG. 1C; FIG. 2D illustrates a graph of initial and ending currents in potential step 4 of FIG. 1C; FIG. 2E illustrates a graph of initial and ending currents in potential step 5 of FIG. 1C; and FIG. 2F illustrates a graph of initial and ending currents in potential step 6 of FIG. 1C.

FIG. 6 illustrates a table summarizing Graw and $G_{comp}$ from i10, R4, y45, and R1 with an in-vitro data set according to one or more embodiments of the disclosure.

DETAILED DESCRIPTION

Embodiments described herein include systems and methods for applying probing potential modulations (PPMs) on top of the otherwise constant voltage applied to an analyte sensor. The terms "voltage," "potential," and "voltage potential" are used herein interchangeably. "Currents," "signals," and "current signals" are also used herein interchangeably, as are "continuous analyte monitoring" and "continuous analyte sensing." As used herein, PPMs refer to intentional changes made periodically to the otherwise constant voltage potential applied to a sensor during continuous analyte sensing, such as application of probing potential steps, pulses, or other potential modulations to the sensor. Use of PPMs during continuous analyte sensing may be referred to as a PP or PPM method, whereas performing continuous analyte sensing without PPMs may be referred to as an NP or NPPM method.

Figure 1A:
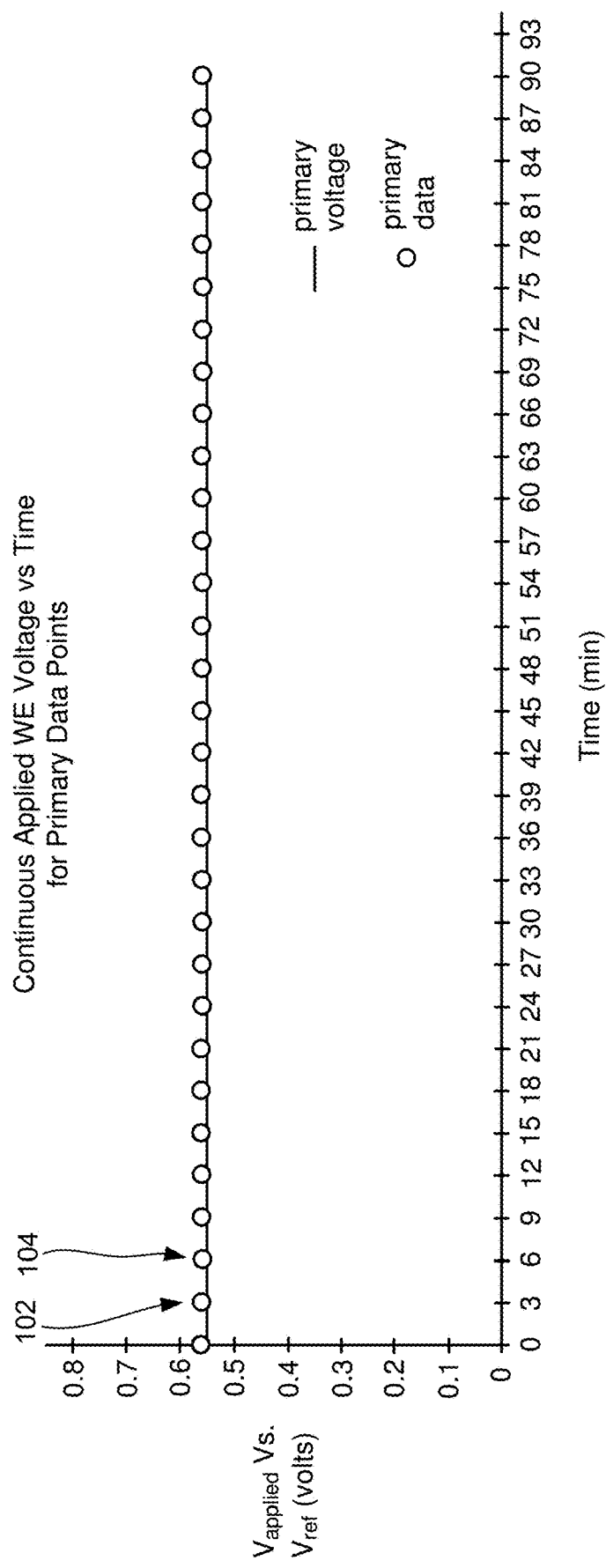
- FIG. 1A illustrates a graph of applied voltage $E_0$ for a continuous glucose monitoring (CGM) sensor versus time according to one or more embodiments of the disclosure.

Primary data points or primary currents refer to measurements of current signals generated in response to an analyte at a constant voltage potential applied to a sensor during continuous analyte sensing. For example, FIG. 1A illustrates a graph of applied voltage $E_0$ for a continuous glucose monitoring (CGM) sensor versus time according to one or more embodiments of the disclosure. Example times at which measurements of primary data points may be made, and subsequent PPMs may be applied, are shown. As shown in FIG. 1A, the constant voltage potential $E_0$ applied to the working electrode of an analyte sensor may be about 0.55 volts in this example. Other voltage potentials may be used.

FIG. 1A shows an example of a typical cycle of the primary data points taken at a constant applied voltage. Primary data points are the data points measured or sampled at a constant applied voltage and at regular intervals, such as 3-15 minutes, during continuous glucose monitoring and are used to compute glucose values for a user. Primary data points may be working electrode currents measured for an analyte sensor during continuous analyte monitoring, for example. FIG. 1A does not show primary data points, but the time and voltage at which each primary data point is measured. For example, circle 102 in FIG. 1A represents the time/voltage (3 minutes/0.55 volts) at which a first primary data point (e.g., a first working electrode current) is measured for a sensor biased at a voltage of $E_0$. Likewise, circle 104 in FIG. 1A represents the time/voltage (6 minutes/0.55 volts) at which a second primary data point (e.g., second working electrode current) is measured for a sensor biased at a voltage of $E_0$.

PPM currents refer to measurements of current signals generated in response to PPMs applied to the sensor during continuous analyte sensing. PPMs are described in more detail below in connection with FIG. 1C.

Reference sensors refer to sensors used to generate primary data points and PPM currents in response to reference glucose concentrations represented by blood glucose meter (BGM) readings, for example (e.g., primary currents and PPM currents measured for the purpose of determining prediction equations that are subsequently stored in a continuous analyte monitoring (CAM) device and used during continuous analyte sensing to determine analyte concentrations).

For sensors deployed in a non-whole blood environment with relatively constant temperatures, such as sensors used in a continuous in-vivo sensing operation, sensor error may be related to the sensor's short and long-term sensitivity and method of calibration thereafter. There are several problems/issues associated with such a continuous sensing operation: (1) the long break-in (warmup) time, (2) the factory or in-situ calibration, and (3) the change in sensitivity during the continuous sensing operation. These issues/problems are seemingly related to the sensor sensitivity as expressed in the initial decay (break-in/warmup time), the change in sensitivity due to the susceptibility of the sensor to the environment while in sensor production, and the environments/conditions in which the sensor is thereafter deployed.

For a continuous glucose monitoring (CGM) biosensor, which is usually operated with a constant applied voltage, the currents from the mediator are measured continuously as a result of the enzyme oxidation of the target analyte glucose. In practice, currents are typically measured or sensed every 3 to 15 minutes or at another regular interval despite being referred to as continuous. There is an initial break-in time when the CGM sensor is first inserted/implanted into a user, which may last from 30 minutes to several hours. Once the CGM sensor is broken-in, its sensitivity may still change for various reasons. Thus, there is a need to sense the sensor's operating condition during its initial and after break-in times to identify any changes in its sensitivity.

The CGM sensor operation starts with the applied voltage $E_0$ after it is inserted/implanted subcutaneously into a user. The applied voltage $E_0$ is usually at a point on the redox plateau of the mediator. For the natural mediator of oxygen with the enzyme of glucose oxidase, the oxidation plateau of hydrogen peroxide $H_2O_2$ (the oxidation product of the enzyme reaction) ranges from about 0.5 to 0.8 volts versus an Ag/AgCl reference electrode in a media of about 100-150 mM chloride concentration. The operation potential for the glucose sensor may be set at 0.55-0.7 volts, which is within the plateau region.

Embodiments described herein employ PPMs as periodic perturbations to the otherwise constant voltage potential applied to the working electrode of a subcutaneous biosensor in a continuous sensing operation (e.g., for monitoring a biological sample analyte such as glucose). During a continuous sensing operation, such as continuous glucose monitoring, sensor working electrode current is typically sampled every 3-15 minutes (or at some other frequency) for glucose value determinations. These current measurements represent the primary currents and/or primary data points used for analyte determinations during continuous sensing operation. In some embodiments, periodic cycles of probing potential modulations (PPMs) may be employed after each primary current measurement so that a group of self-sufficient currents accompanies each primary data point with information about the sensor/electrode status and/or condition.

Figure 1B:
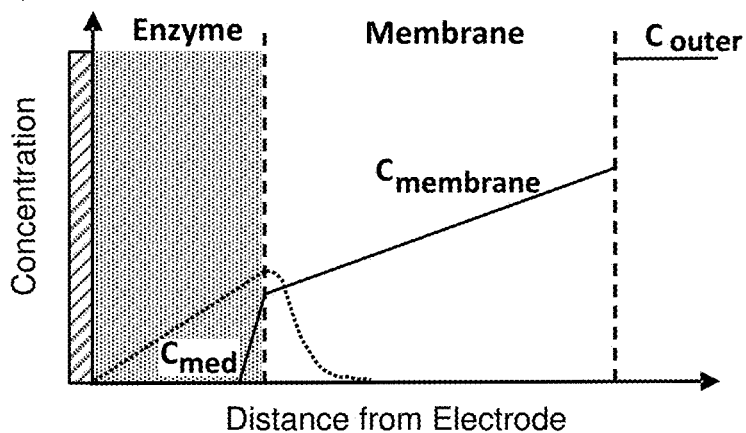
FIG. 1B illustrates a graph of a steady-state condition attended at the electrode and its nearby boundary environment according to one or more embodiments of the disclosure.
Figure 1C:
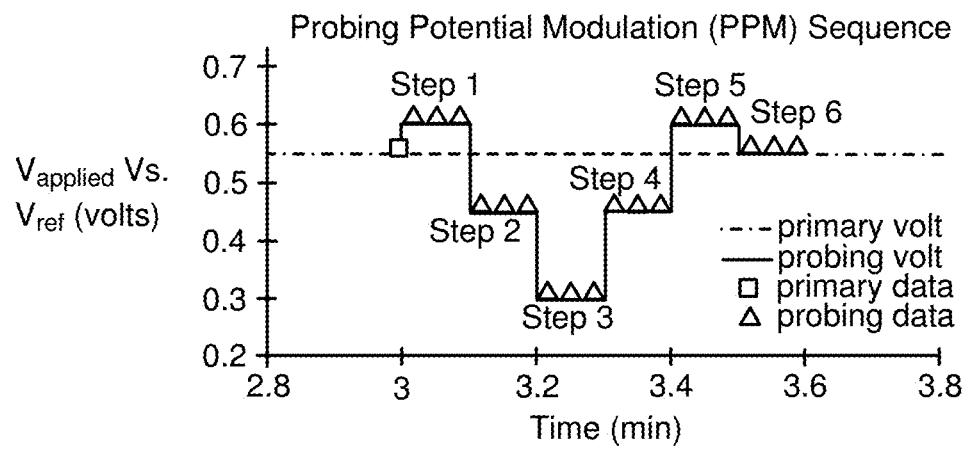
FIG. 1C illustrates a graph of an example of a probing potential modulation (PPM) sequence according to one or more embodiments of the disclosure.

PPMs may include one or more steps in potential that are different than the constant voltage potential normally used during continuous analyte monitoring. For example, PPMs may include a first potential step above or below the constant voltage potential, a first potential step above or below the constant voltage potential and then a potential step returning to the constant voltage potential, a series of potential steps above and/or below the constant voltage potential, voltage steps, voltage pulses, pulses of the same or different durations, square waves, sine waves, triangular waves, or any other potential modulations. An example of a PPM sequence is shown in FIG. 1C.

As described, conventional biosensors used in continuous analyte sensing are operated by applying a constant potential to the working electrode (WE) of the sensor. Under this condition, the currents from the WE are recorded periodically (e.g., every 3-15 minutes or at some other time interval). In this way, biosensors generate currents that are only attributable to changes in analyte concentrations, not changes in applied potential. That is, non-steady-state currents associated with the application of different potentials are not present. While this approach simplifies the continuous sensing operation, the current signals in the data stream from application of a constant potential to the sensor provide minimum information about the sensor status/condition. That is, sensor current signals from application of a constant potential to a sensor provide little information relevant to issues associated with long-term continuous monitoring by the sensor, such as lot-to-lot sensitivity variations, the long warmup time due to initial signal decay, sensor sensitivity changes over a long-term monitoring process, effects from varying background interfering signals, or the like.

Continuous glucose monitoring (CGM) sensors implanted subcutaneously require timely calibrations against a reference glucose value. Conventionally, the calibration process involves taking a blood glucose meter (BGM) reading from a finger stick glucose measurement, or the capillary glucose value and entering the BGM value into the CGM device to set the CGM sensor's calibration point for the next operation period. Usually, this calibration process takes place on a daily basis, or at least one finger stick glucose measurement per day as the CGM sensor's sensitivity may change from day to day. This is an inconvenient but necessary step to ensure the accuracy of the CGM sensor system.

Embodiments described herein include systems and methods for applying PPMs on top of the otherwise constant voltage applied to an analyte sensor. Methods are provided for formulating parameters for a prediction equation that may be employed to accurately determine analyte concentrations continuously from an analyte sensor. Furthermore, methods of and systems for determining analyte concentrations with the use of probing potential modulation (PPM) self-sufficient signals are provided. Such methods and systems may allow analyte concentration determinations while (1) overcoming the effects of different background interfering signals, (2) levelling or removing the effects of different sensor sensitivities, (3) shortening the warmup time at the beginning of a (long-term) continuous monitoring process, and/or (4) correcting sensor sensitivity changes over the continuous monitoring process. These and other embodiments are described below with reference to FIGS. 1A-7.

Disclosed herein are sensor boundary conditions related to the non-steady-state (NSS) condition during a PPM cycle for determining the analyte concentrations in a continuous analyte monitoring operation. The sensor membrane structure and the boundary condition play a unique role in establishing the steady-state (SS) condition, the NSS condition, and the alternation of the SS and NSS conditions for the determination of an analyte concentration. Below, the boundary condition is described for SS and NSS establishment and for the analyte concentration determination.

Steady-state condition: Conventional biosensors used in continuous analyte sensing are operated under a steady-state condition which is established when a continuous monitoring sensor is stabilized after a settling time with a constant applied potential to the working electrode (WE). Under this condition, the currents are drawn from a constant flow of incoming analyte molecules in a steady-state diffusion condition, created by the outer membrane. This condition is depicted in FIG. 1B.

The typical dry thickness of the outer membrane is in the order of 5-15 um, more likely in the order of 8-12 um. When the sensor is submerged in a liquid sample, or inserted into the skin subcutaneously, the membrane structure will be re-hydrated and expanded to a stable thickness of 30-60 um, and more likely on the order of 40-50 um. During the time of rehydration, the sensor responses will change over time. The typical dry thickness of the enzyme layer is on the order of 1-3 um, and more likely under 2 um. Upon rehydration, the enzyme layer is not expanded as much due to cross-linking by a binder, locking the structure tightly in place. For effectiveness of sensor operation, the ratio of the enzyme layer to the outer membrane layer may be on the order of 1:10 under the stabilized membrane rehydration. Other membrane and/or enzyme layer thicknesses may be employed.

The boundary structure as defined by the enzyme layer, and the outer membrane, in theory creates a boundary environment to draw a constant flux of measurable species, or the reduced mediator, approximately defined by the straight line $C_{med}$. When there is no change in the analyte concentration, the current is proportional to the concentration gradient of the measurable species at the electrode surface, which is further dependent on the analyte concentration gradient as defined by the boundary condition.

The boundary environment: The boundary condition in FIG. 1B may be interpreted in theory as follows: The analyte concentration $C_{outer}$ is at some value which is in equilibrium with the membrane concentration $C_{membrane}$ at the outer interface of the membrane. The lower concentration of $C_{membrane}$ inside the membrane indicates that the membrane is designed to reduce the influx of analyte molecules so that the biosensor operates at a steady-state condition. The relationship between $C_{outer}$ and $C_{membrane}$ is approximately expressed by an equilibrium constant $K_{outer}=C_{membrane}/C_{outer}<1$. It is further governed by a lower diffusion coefficient $D_{membrane}$ than $D_{pouter}$. Together the membrane permeability for the analyte $P_{membrane}=D_{membrane}*C_{membrane}$ defines the throughput of the analyte. As the analyte molecules move toward the electrode covered with enzyme, they are quickly attenuated to zero by the enzyme. Meanwhile, the enzyme converts the analyte molecules into the measurable species oxidizable at the electrode, such as $H_2O_2$ with oxygen as the mediator with respect to the glucose oxidase enzyme. The measurable species will diffuse toward the electrode as well as toward the membrane once generated.

Under the constant applied voltage of fully oxidizing the measurable species, there will be a constant flux of the measurable species drawn toward the electrode. Soon, a steady-state is established where the current is proportional to the concentration gradient of the measurable species ($dC_{med}/dx$) at the electrode surface. Under the diffusion limited condition (meaning that the oxidization/consumption rate of the measurable species is at a maximum, limited only by the diffusion of the measurable species), the concentration gradient $C_{med}$ is projected to be a straight line, defined at the electrode surface as being zero and to a point at the membrane interface which is defined by the equilibrium condition reached by multiple processes (analyte flux entering the enzyme, the consumption and conversion of analyte by the enzyme, and the diffusion of the measurable species). The concentration $C_{med}$ into the membrane is loosely defined by diffusion. It is preferable for the measureable species to have a slow diffusion rate inside the membrane rather than outside the membrane so that the measurable species is trapped inside the membrane starting from the enzyme layer. This steady-state condition is dynamically changing as the outer analyte concentration changes. In the operation condition governed by PPM cycles, the primary data points are in fact sampled and recorded under the steady-state condition because the boundary environment resumes to the steady-state condition after the non-steady-state potential modulation cycle.

Potential modulation and non-steady-state condition: If the applied potential is modulated away from the constant voltage, such as a potential step from 0.55 V to 0.6 V (step 1 in FIG. 1C and $E_0$ to $E_1$ in FIG. 1E), but still within the mediator's oxidation plateau (diffusion limited region in the V-axis), there will be some finite current generated with a small decay. This is still a faradaic process due to the asymmetrical plateau governed by $\exp(E_{app}-E^{0'})$, where $E_{app}$ is the applied voltage and $E^{0'}$ is the redox species formal potential representing its electrochemical property. This finite current with a small decay may be referred to as the plateau-degenerate, meaning a slightly different oxidation state on the plateau. The current-to-voltage relationship of the mediator is approximately described in FIG. 1F. An example of such output current is shown and labelled as i11, i12 and i13 in FIG. 1F, while i10 is the primary current under a steady-state condition. For example, i11 is the first current sampled during the first potential step.

Figure 1D:
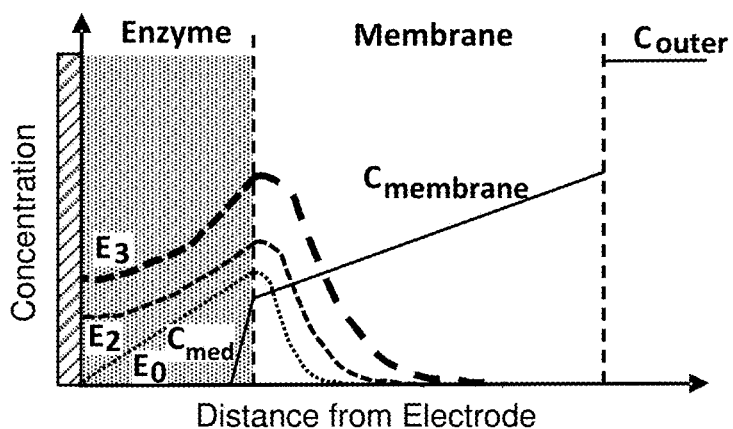
FIG. 1D illustrates a graph of a non-steady-state condition attended at the electrode and its nearby boundary environment during E2 and E3 potential steps according to one or more embodiments of the disclosure.
Figure 1E:
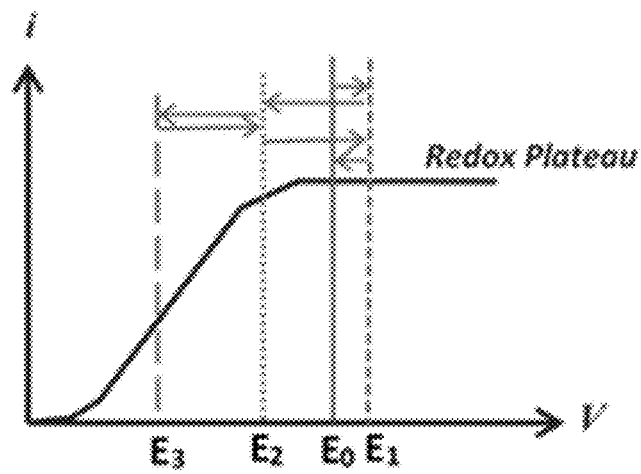
FIG. 1E illustrates a graph of an I-V curve and the individual potential steps for the PPM sequence of FIG. 1C implemented according to one or more embodiments of the disclosure.
Figure 1F:
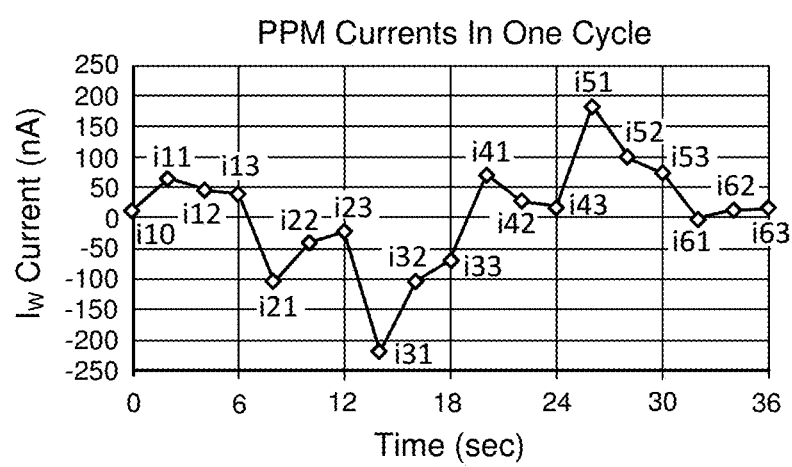
FIG. 1F illustrates a graph of typical output currents from the PPM sequence shown in FIG. 1C with labelling of currents in each potential step according to one or more embodiments of the disclosure.

If the applied potential is reversed to a lower voltage, or specifically from $E_1$ to $E_2$ and further to $E_3$ in FIG. 1E (steps 2 and 3 in FIG. 1C), two things will happen: (1) the measurable species is no longer fully oxidized at the electrode surface because of the lower potential, (2) there is partial reduction of the measurable species or the oxidized form of the mediator, with the generation of negative currents. The combined effect of these two events accumulates an excess measureable species at and near the electrode surface. Thus, the concentration profile is disrupted from the otherwise straight-line condition reaching zero at the electrode surface. This condition is referred to as the non-steady-state, which is shown in FIG. 1D, where $C_{med}$ is not at zero at the electrode surface. The output currents of such effect are shown as negative and labelled as i21, i22, i23 and i31, i32, i33 in FIG. 1F for steps 2 and 3 of FIG. 1C. The negative currents suggest a partial reduction by the potential steps from high to low. The disruption of the steady-state condition only occurs near the electrode surface if the process is short while the boundary environment inside and outside the membrane ($C_{membrane}$ and $C_{outer}$) remains unchanged.

Alternation of NSS and SS conditions: When the potential is reversed again in step 4 from $E_3$ to $E_2$ as shown in FIG. 1C and FIG. 1E, part of the accumulated measurable species is consumed where oxidation is at a higher rate set by the higher potential $E_2$. Even though $E_2$ is not at the plateau region of the redox species, this step provides a sudden consumption of the measurable species and produces a jump in current output from the non-steady-state concentration, and thus provides a strong indication of the concentration. Step 5 in FIG. 1C from $E_2$ to $E_1$ (FIG. 1E) further completes the non-steady-state oxidation of the excess species to position the sensor at an operation potential on the plateau region again. Step 6 in FIG. 1C takes a negative plateau-degenerate step to return to the original potential which leads to resuming the steady-state condition before the next potential modulation cycle. Such condition is depicted in FIG. 1B. Thus, when the PPM cycle is repeated, the conditions of steady-state and non-steady-state are alternating and providing signals for analyte concentration determinations.

The PPM method described above provides primary data (e.g., primary currents obtained during SS) as the indicator of the analyte concentration, while the associated PPM currents and the PPM parameters are the parameters providing information about sensor and electrode condition compensation. The example PPM sequences and output current profiles described all have a potential step from high to low before reversing back to high, and thus the alternation of the steady-state and non-steady-state conditions.

An important aspect of the boundary environment for achieving the non-steady-state condition as well as the alternation of the steady-state and the non-steady-state conditions, is for the membrane to maintain the relationship of $K_{outer} = C_{membrane}/C_{outer} < 1$, and further by the lower diffusion coefficient $D_{membrane}$ than/pouter. Together the membrane permeability for the analyte $P_{membrane} = D_{membrane} * C_{membrane}$ defines the throughput of the analyte. This relationship expresses that the analyte solubility is lower inside the membrane than the solubility outside the membrane. In some embodiments, $K_{outer}$ may be about 0.1-0.9, in some embodiments about 0.2-0.7, and in some embodiments about 0.2-0.4.

The multi-layer structure of the enzyme and the membrane provides a composite mass transport process with diffusion traversing two different media if the outer membrane interface is anchored by $K_{outer} < 1$. For the incoming analyte, the diffusion through the outer membrane is the main process with its concentration being attenuated quickly to zero by the enzyme layer. For the enzyme reaction product, or the measurable species, the mass transport in the enzyme layer will be transient due to the very thin enzyme layer. Taking the diffusion layer thickness by the commonly known definition $(Dt)^{1/2}$, it will only take 0.18 sec for diffusing species to traverse an enzyme layer of 3 μm with a diffusion coefficient of $5 \times 10^{-7}$ cm$^2$/sec for the measurable species. On the other hand, it will take 18 sec for diffusing species to traverse a membrane thickness of 30 μm with the same diffusion coefficient. This implies that the diffusion process in the enzyme layer can be practically ignored in comparison to that in the membrane layer during the cycling of potential modulations. The membrane serves as a trap for the measurable species, preventing diffusion to outside the membrane (under the condition of slow diffusion starting from the enzyme layer). The alternation cycle of steady-state and non-steady-state, especially in potential step 4 (FIG. 1C), captures virtually all of the excess measurable species accumulated during the reversed potential steps 2 and 3 (FIG. 1C). As long as there is a sufficient amount of the mediator present, the enzyme reaction will be sustained at a constant rate with a constant supply of the incoming analyte governed by the equilibrium constant $K_{outer} < 1$, which ensures the establishment of the steady-state condition shown in FIG. 1B.

Figure 2A:
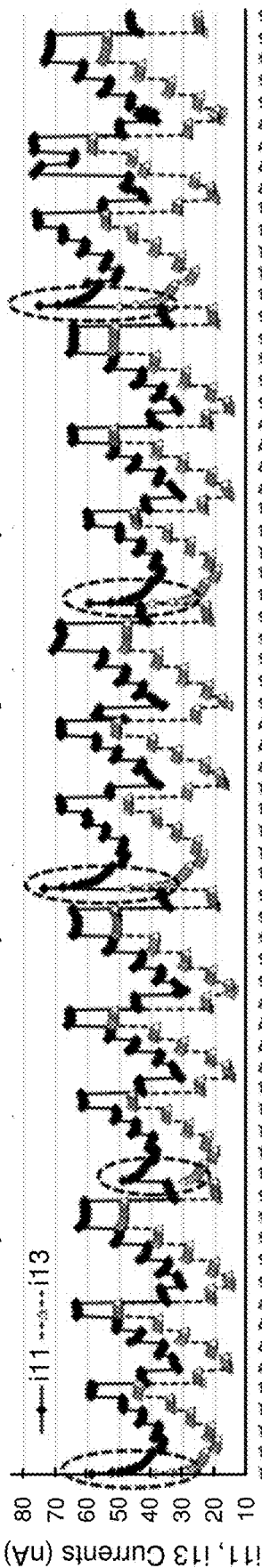
Figure 2B:
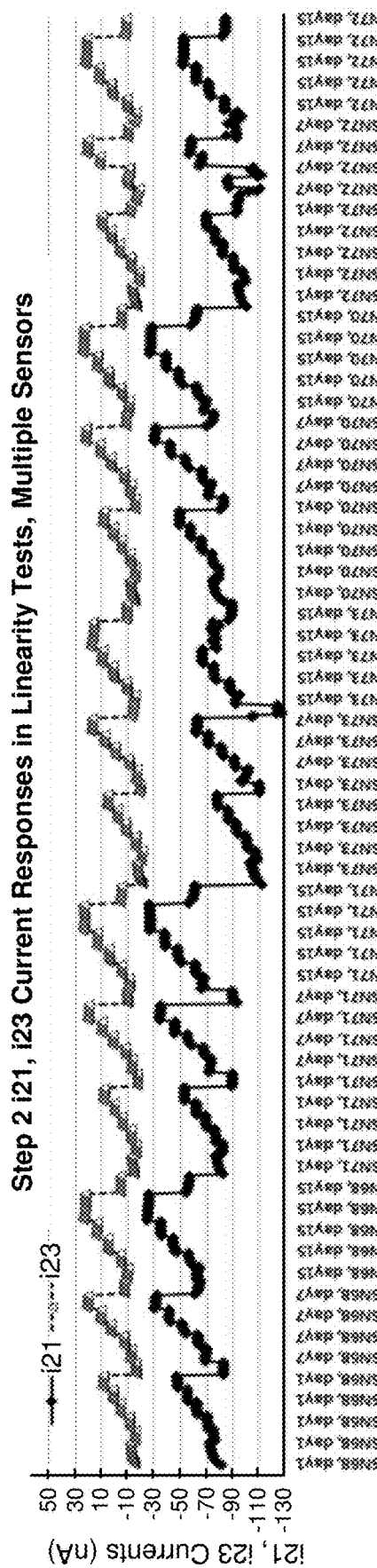
Figure 2C:
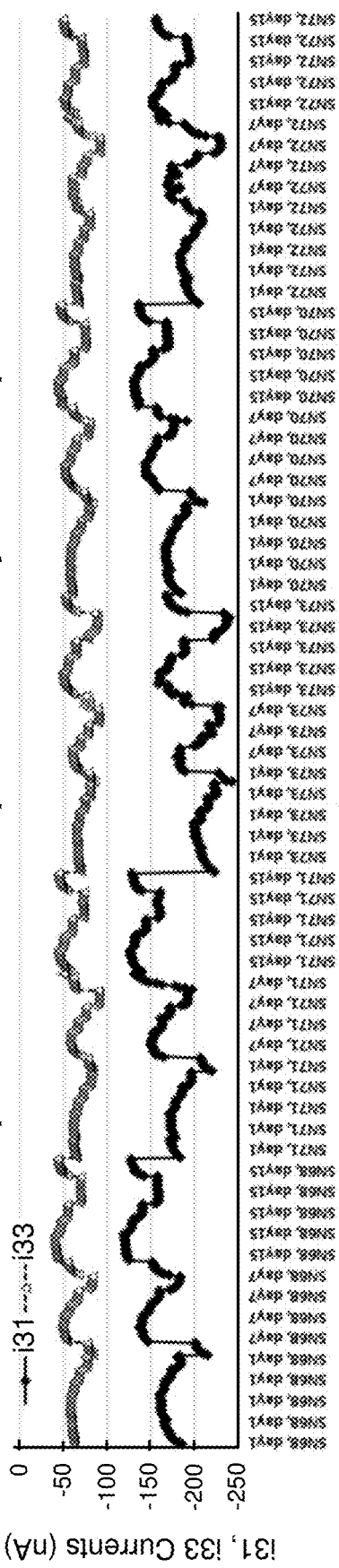
Figure 2D:
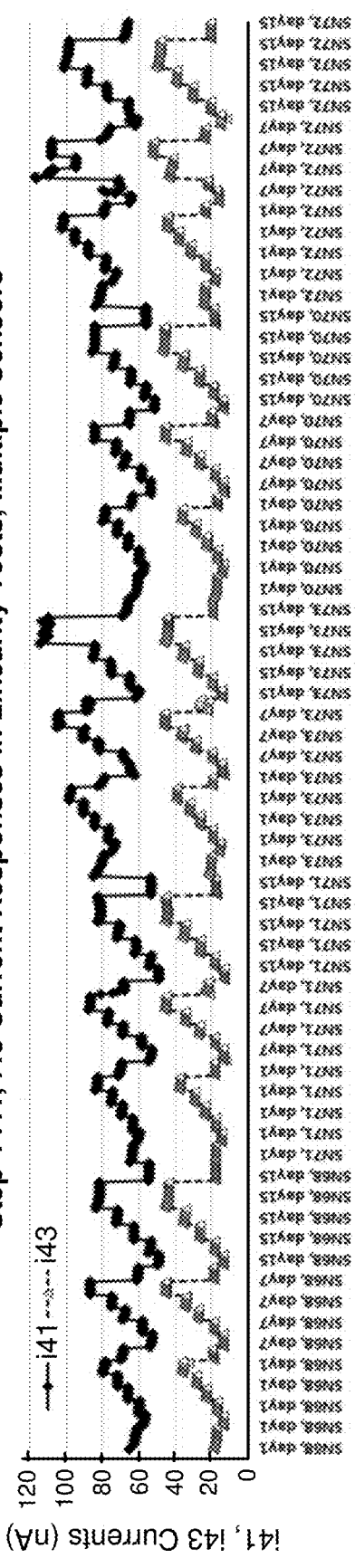

FIGS. 2A-F present example output current signals of the initial and ending currents from five different sensors in line plots resulting from potential steps 1 through 6 of FIG. 1C, respectively, in accordance with embodiments provided herein. The following observations are made. First, the initial transient decay of currents is minimal for the potential steps with a potential reversal (see FIGS. 2B, 2D and 2F). This includes potential steps 2, 4, and 6 of FIG. 1C. Second, the responsive currents are well defined step-wise to the analyte concentrations for potential steps 2, 4 and 6 as well. Third, in contrast, the potential steps extending from a stable condition, or extending positively to a higher potential give a strong initial decay for the individual sensors lasting for at least one hour in in-vitro tests. This includes potential steps 1 and 5 of FIG. 1C (see circled areas in FIGS. 2A and 2E which are the beginning of each sensor in the line plots). Fourth, the currents in the potential step extending the negative potential (step 3 in FIG. 1C) do not have well-defined steps corresponding to the analyte concentrations, as shown in FIG. 2C. Fifth, the current differences between the initial and ending currents of a potential step are small for the plateau-degenerate condition, such as potential steps 1 and 6 of FIG. 1C (see FIGS. 2A and 2F). Sixth, the current differences between the initial and ending currents of a potential step are relatively large for the potential steps in which potential direction is switched (see FIGS. 2B and 2D). This includes potentials steps 2 and 4 of FIG. 1C.

From the above data presentation and observations, it can be seen that potential step 4 of FIG. 1C (see also FIG. 2D) leads to several desirable characteristics, such as minimal initial decay, well defined responses to analyte concentrations, large separations between the initial and ending currents within one potential step. This is not a coincidence given the description and the analysis of the data from the non-steady-state condition.

To capture the current change in a potential step, or the current decay, decay constants are defined to describe the decay process. In this regard, two decay constants are devised below. One is expressed in terms of a ln (natural logarithmic) function, and one is expressed as a simple current ratio. In the ln function expression, the decay constant is defined as $K = (\ln(i_2) - \ln(i_1))/(\ln(t_2) - \ln(t_1))$. In this expression, $K = 0$ if there is no decay. Furthermore, if the decay constant value is close to 0, the decay is small/shallow while if the decay constant is further away from 0, the decay is relatively large/steep. In the current ratio expression, the constant is defined as $R = i_{t2}/i_{t1}$. In both the K and R definitions, $t_2 > t_1$, indicating that $t_2$ is a later time than $t_1$. For the current recording format of having three PPM currents per potential step, there are two constants associated with one step. They are the constants defined by i13/i12 and i13/i11 for potential step 1, for instance. For the embodiment to be explained in the following section, the decay constant is defined as R1=i13/i11, R2=i23/i21, R3=i33/i31, R4=i43/i41, R5=i53/i51 and R6=i63/i61, that is, the ratio=last current/first current. In the R expression, R=1 if there is no decay. Small decay processes will have R values close to 1, while large decay processes will have the R values away from 1.

Figure 3A:
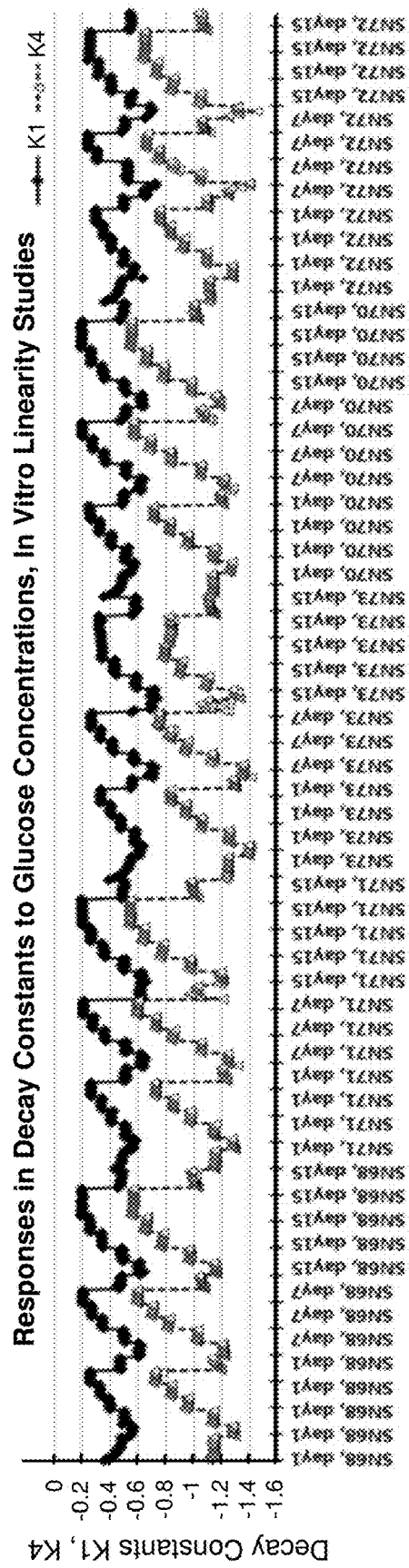
FIG. 3A illustrates a graph comparing decay constants K1 and K4 according to one or more embodiments of the disclosure.

FIGS. 3A-F present line plots converted from currents in FIGS. 2A-F, respectively, to explain the concepts of decay constants and their relationship to the steady-state and non-steady-state in accordance with embodiments provided herein. FIG. 3A is a comparison of the decay constants K1 and K4 calculated by $K = (\ln(i_{t=6\,sec}) - \ln(i_{t=2\,sec}))/(\ln(6\,sec) - \ln(2\,sec))$ from the PPM currents of potential steps 1 and 4 of FIG. 1C, where the same data sets were from different linearity tests of different sensors. By comparing the K constants from different steps, the relative magnitudes of decay constants reflect the nature of the decay, whether they are shallow or steep, thus the nature of the electrochemical processes. For example, $K1 = (\ln(i13) - \ln(i11))/(\ln(6) - \ln(2))$. In the process of potential step 4, the K4 values are derived from a non-steady-state condition as a result of oxidizing the excess measurable species accumulated during the reversed potential steps 2 and 3. The decay constant values are substantially away from the otherwise no decay condition, or 0 value.

Figure 3B:
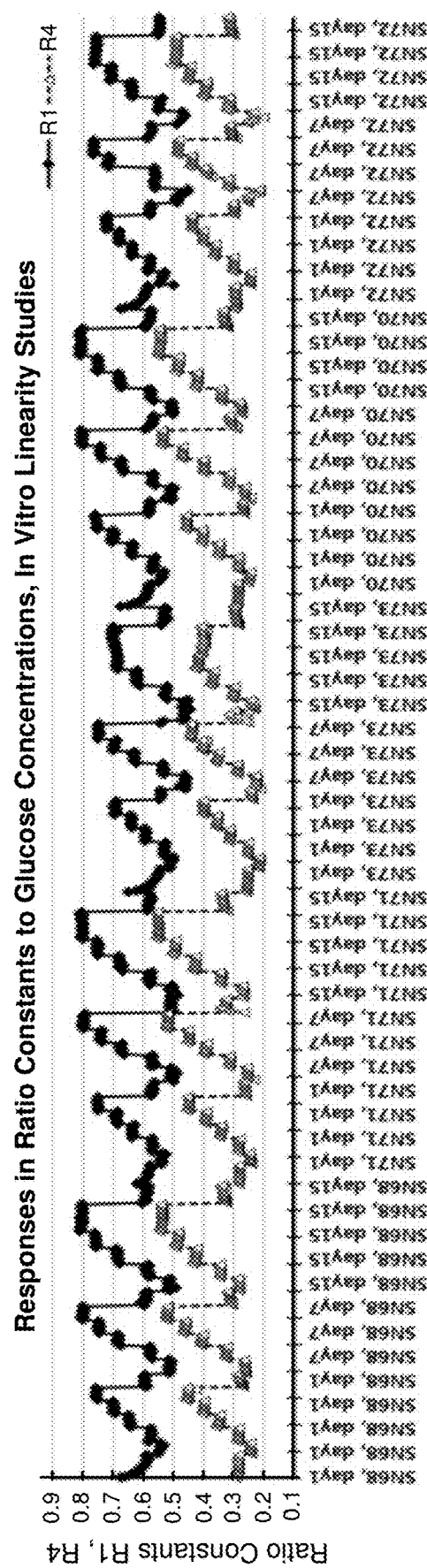
FIG. 3B illustrates a graph comparing ratio constants R1 and R4 according to one or more embodiments of the disclosure.

FIG. 3B is a comparison of the ratio constants R1 and R4, the counterparts of K1 and K4, calculated from the PPM currents from potential steps 1 and 4 of FIG. 1C by Ratio=$t_{t=6\ sec}/i_{t=2\ sec}$. For example, R1=i13/i11. By comparing the R constants from different steps, the relative magnitudes of decay constants reflect the nature of the decay, whether they are shallow or steep, thus the nature of the electrochemical processes. The R1 values from potential step 1 are close to 1, the no decay condition, while the R4 values from potential step 4 are substantially away from 1 (the decay condition). These seemingly implicit constants reflecting the sensor information adjacent to every primary data point are fed into the multi-variate regression (described below) where the most representative parameters are selected for the compensation equation.

Figure 3C:
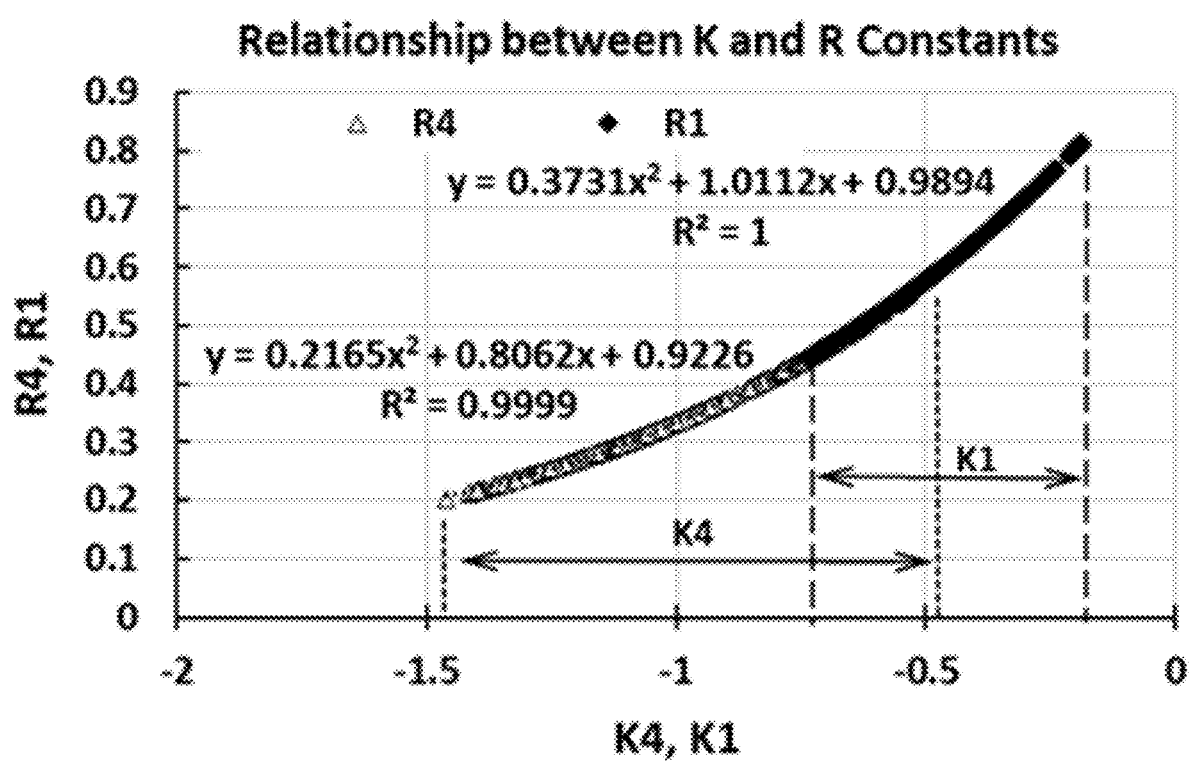
FIG. 3C illustrates a graph of a correlation between ratio constants R1 and R4 and decay constants K1 and K4 according to one or more embodiments of the disclosure.

FIG. 3C is a correlation between the R1, R4 ratios and the K1, K4 values from FIGS. 3A and 3B. Overall, the correlation curve reflects the different mathematical expressions of the decay processes. The R1 and K1 constants are close to their limits of no decay while the R4 and K4 constants are away from these limits. The curve-fitted equation of R1=0.3731*K1$^2$+1.0112*K1+0.9894 for the upper portion of the curve indicates that as the K1 value approaches zero, the R1 ratio approaches 1 (the intercept of 0.9894). This is the no-decay condition, and it is not a coincidence. Both the R and K constants express that the decay from potential step 1, or the plateau-degenerate process, is shallow with only finite electrochemical reaction.

From the comparisons in FIGS. 3A, 3B, and 3C, it can be seen that potential step 4 is substantially more involved in the electrochemical reaction than potential step 1. In terms of the responses, both the current signals and the ratio constants from potential step 4 are more responsive to analyte concentrations than those from potential step 1. In addition, the signals/ratios from step 4 provide a much shorter initial warmup time than those from step 1. The fact that the decay constants provide step-wise responses to the analyte concentrations arises from their underlying current signals being responsive to the analyte concentrations. However, the extracted parameters provide sensor response information in a different dimension, such as the decay of the electrochemical processes.

Figure 3D:
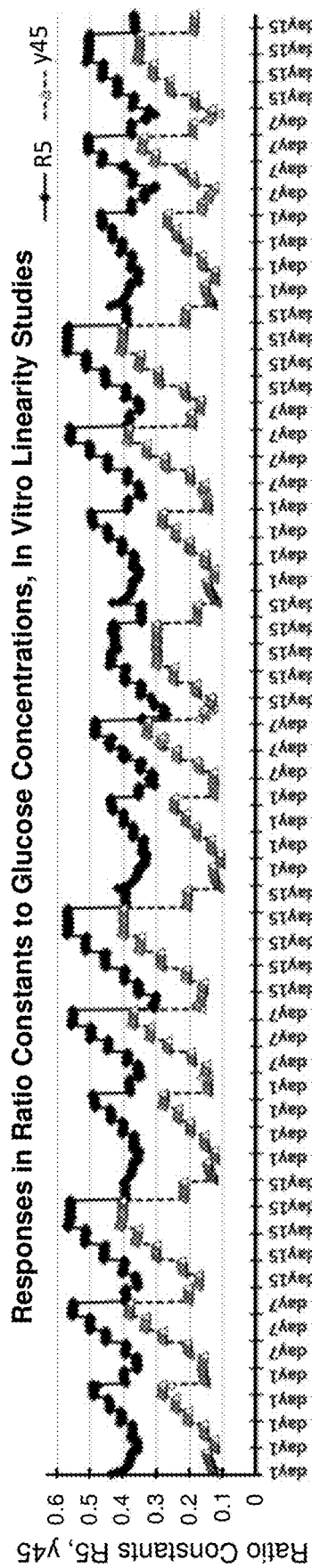
FIG. 3D illustrates a graph comparing ratio constants R5 and y45 according to one or more embodiments of the disclosure.

FIG. 3D shows the R5 (=i53/i51) ratio values and the ratio values of inter-step y45 (=i43/i51) in accordance with embodiments provided herein. Comparatively speaking, the R5 range is between the R1 and R4 values. This indicates that the decay process is steeper than that in potential step 1, but less than that in potential step 4. Ratio y45 is not a decay constant for the meaning defined above, but it is still expressing the behavior similar to that of R4 and provides very strong responses to the analyte concentrations. Finally, parameter y45 provides a relative measure of the processes across two potential steps returning to the redox plateau. Besides providing the stepwise responses to glucose, this parameter has the lowest intercept term, or background value, among all the positively responding parameters.

Figure 3E:
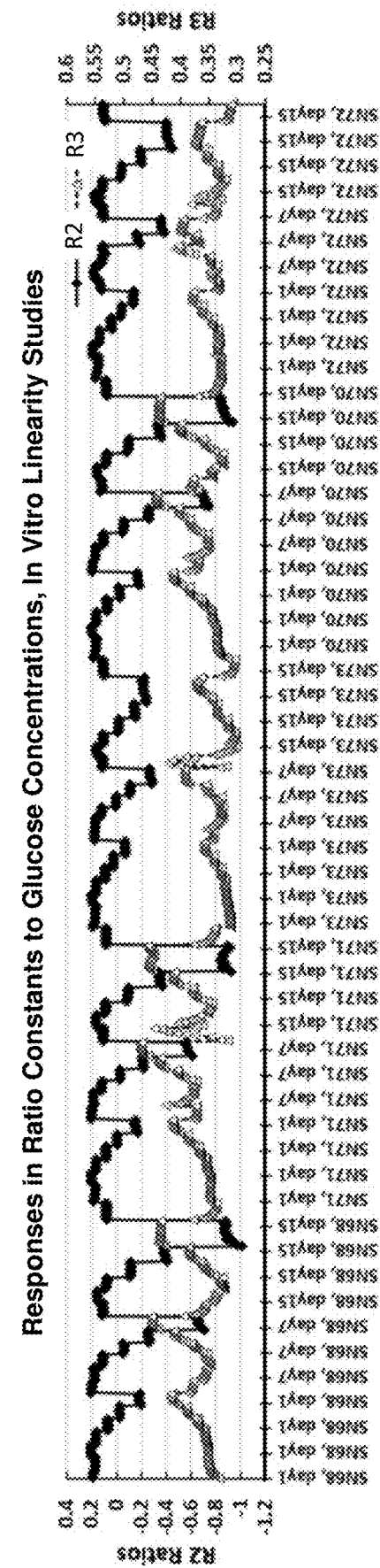
FIG. 3E illustrates a graph comparing ratio constants R2 according to one or more embodiments of the disclosure.
Figure 3F:
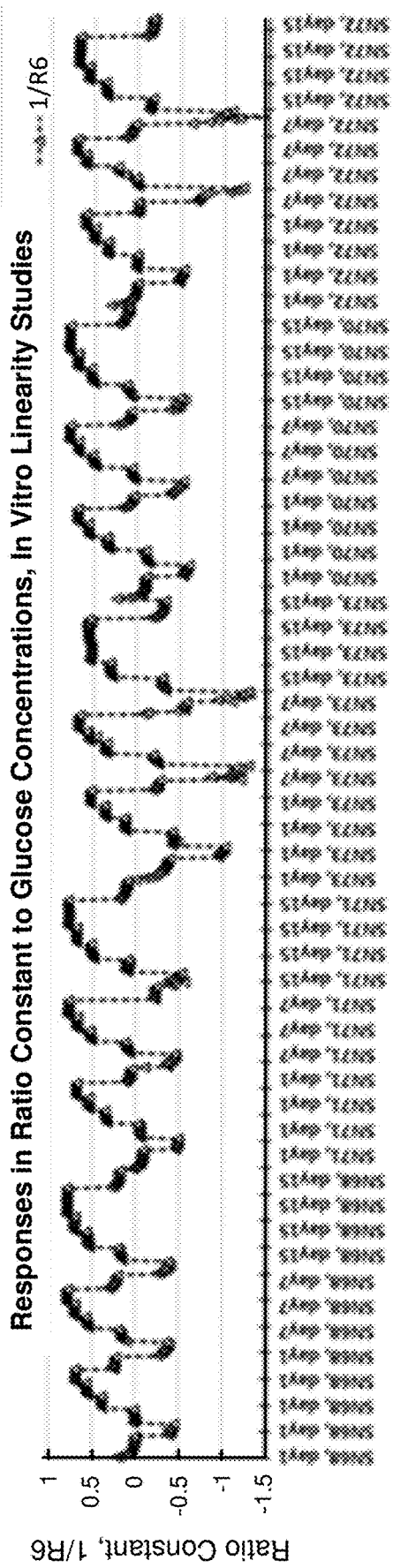
FIG. 3F illustrates a graph of ratio constant 1/R6 according to one or more embodiments of the disclosure.

FIG. 3E shows the R2 (=i23/i21) and R3(=i33/i31) constants. Potential step 2 of FIG. 1C induces a current reversal negatively due to the negative potential switch. The resulting negative current switch is in part due to setting the redox state to less-than-full oxidation/partial reduction of the measureable species at potential $E_2$. However, the current decay is still positive, meaning that the later currents in a potential step are lower than the earlier currents (absolute values) in either the positive or negative domain. The R2 ratios provide strong, though not linear, responses inversely to the analyte concentrations. Potential step 3 of FIG. 1C further lowers the voltage to a different ratio of oxidation-reduction where the overall R3 ratios are not as well defined in responding to the analyte concentrations, even though they still provide positive responses.

According to the literature, hydrogen peroxide $H_2O_2$ diffuses in water with an effective coefficient of approximately $1.5\times10^{-5}$ to $2\times10^{-5}$ cm$^2$ s$^{-1}$, and as the water content in the membrane decreases the effects on diffusivity are relatively prominent. Hence, the limiting factor for diffusion becomes the water content, whereas, at low levels of water in the membrane, the limiting factor becomes the polymer chains. This property of $H_2O_2$ makes the membrane a trap before $H_2O_2$ diffuses outside the membrane, instead of staying nearby as an excess amount of measurable species.

Various commercially available polymers for hydrogen peroxide permeability have been tested. Effective diffusion coefficients were obtained from concentration evolutions of $H_2O_2$ in two compartments separated by a polymer membrane. Measured values were in the range of $5.12\times10^{-9}\pm8.50\times10^{-10}$ to $2.25\times10^{-6}\pm1.00\times10^{-7}$ for polyurethanes, $1.50\times10^{-6}\pm7.00\times10^{-8}$ for perfluorinated ion-exchange membrane such as Nafion® 117 (available from The Chemours Company of Wilmington, Delaware), and $5.76\times10^{-7}\pm4.60\times10^{-8}$ for polymethyl methacrylate (PMMA).

In some embodiments, the PPM cycle or sequence is designed to take no more than half of the time of the primary data cycle (e.g., 3-5 minutes) to allow sufficient time for the constant voltage applied to the working electrode for the steady-state condition to resume before the next primary data point is recorded. In some embodiments, the PPM cycle may be on the order of about 1 to 90 seconds, or no more than 50% in a regular 180-second primary data cycle.

In one or more embodiments, the PPM cycle may be about 10-40 seconds and/or include more than one modulation potential step around the mediator's redox plateau. In some embodiments, the PPM sequence may be on the order of 10-20% of the regular primary data point cycle. For instant, when the regular primary data point cycle is 180 seconds (3 minutes), a PPM cycle of 36 second is 20% of the primary data point cycle. The remaining time of the primary data cycle allows the steady-state condition to resume at the constant applied voltage. For the potential steps in the PPM cycle, the durations are of a transient nature such that the boundary conditions of the measurable species created by these potential steps are non-steady-state. Thus, each potential step may be on the order of 1-15 seconds, in some embodiments, about 3-10 seconds in other embodiments, and about 4-6 seconds in yet other embodiments.

In some embodiments, the probing potential modulation may step into the potential region of the non-diffusion-limited redox condition, or the kinetics region of the mediator (meaning the output currents are dependent on the applied voltage with the higher applied voltage producing higher output currents from the electrode). For instance, E2 and E3 of FIG. 1E (steps 2 and 3 of FIG. 1C) are two potential steps in the kinetics region of the mediator generating the non-steady-state output currents from the electrode. On reversal of the potential steps, the same magnitudes of applied voltages E2 and E1 are resumed to probe the output currents of non-steady-state from the electrode.

Different embodiments of attending non-steady-state conditions may be employed. For instance, the non-steady-state conditions may also be probed by one-step directly to the target potential E2 and returning to the starting potential E1, which is followed by a second probing potential step going directly to a different potential E3 in the kinetics region with a different non-steady-state condition, and then directly returning to the starting potential E1. The intent is to modulate the applied potentials to create the alternation of steady-state and non-steady-state conditions for the measurable species at the electrode surface whereby signals from the non-steady-state may be used for determining the analyte concentrations.

Use of Conversion and Connection Functions

Given the uncertainty of making a one-to-one correlation between in vitro and in vivo sensitivities, a method of making a connection from in vitro to in vivo glucose is disclosed herein by applying a unified "conversion function" to the data of a wide range of sensor responses, followed by a "connection function" to reduce glucose error to a narrow band. The unified conversion function computes raw or "initial" glucose values $G_{raw}$=f(signal), where "signal" is the measured current signal (or a parameter derived from one or more measured current signals) and "f" may be a linear or non-linear function. When the conversion function f is non-linear, then sensitivity or response slope is not applied (as described below).

In its simplest form, a unified conversion function may be a linear relationship between measured current signals and reference glucose levels obtained from in vitro test data. For example, a unified conversion function may be a linear relationship between the glucose signal (e.g., Iw–Ib, R1, R4, y45, or another PPM current signal or parameter), a slope and reference glucose $G_{ref}$:

$$\text{Signal}=\text{slope}*G_{ref}$$

such that, $$G_{ref}=\text{signal}/\text{slope}$$

where slope represents a composite slope ($\text{slope}_{composite}$), also referred to as a unified composite slope. The above relationship may then be used to calculate an initial or raw glucose $G_{raw}$ during CGM:

$$G_{raw}=\text{signal}/\text{slope}_{composite}$$

PPM current signal parameters such as R1, R4, and y45 may be less sensitive to interference effects and exhibit less warmup sensitivity. For this reason, in some embodiments provided herein, the unified composite slope may be determined from PPM current signal parameters, such as R1, R4, and y45, or another suitable PPM current signal parameter. In some embodiments, rather than using a linear conversion function, a non-linear conversion function, such as a polynomial, may be employed (e.g., to better fit the varied responses of sensors). For example, polynomial fits of R1, R4, and y45 to reference glucose $G_{ref}$ may serve as connection functions for determining an initial or raw glucose value from R1, R4, or y45. Below are example equations for R1, R4, and y45:

For R1: $G_{raw}=4351.9*(R1)^2-4134.4*(R1)+1031.9$
For R4: $G_{raw}=5068*(R4)^2-2213.3*(R4)+290.05$
For y45: $G_{raw}=6266.8*(y45)^2-1325.2*(y45)+117.49$ Other relationships may be used. Note that the equivalent form of Iw–Ib for the primary data (i10) may be used. However, since the R1, R4, and y45 are relatively indifferent to interference effects from other interference species, no background subtraction is used. In some embodiments, multiple conversion functions may be used.

A single conversion makes the in vitro to in vivo connection a simple matter without calibrations, if a connection function is applied to the individual error (% bias=$100\%*\Delta G/G=100\%*(G_{raw}-G_{ref})/G_{ref}$) to obtain the narrow band of glucose. This connection function is derived from the PPM parameters based on the $\Delta G/G_{raw}$ values. By way of such narrowing of the error band from the initial or raw glucose $G_{raw}$, the connection function is referred to as making connection from in vitro to in vivo without calibrations, meaning accommodating all responses of sensors to a narrow band of error.

A connection function is said to be a broad scope connection from the in vitro glucose to the in vivo glucose when the connection function provides the predicted in vivo glucose values to a narrow band of error without calibration. In this context, it is not seeking to establish the one-to-one corresponding relationship for the in vitro sensitivity and in vivo sensitivity. Instead, the connection function will provide glucose values from sensors within a sensitivity range as long as the sensors are responsive to glucose. The responses may be linear or non-linear.

Taking advantage of the rich information about CGM sensors from the PPM currents, this function is derived from the PPM currents and the associated parameters. When each response data point at the periodic cycle is converted by a composite conversion function to a glucose value $G_{raw}$, there is an error or %-bias associated with it $\Delta G/G_{raw}=(G_{raw}-G_{ref})/G_{ref}$. By setting $G_{connect}=G_{ref}$, then $G_{connect}=G_{raw}/(1+\Delta G/G_{raw})=G_{raw}/(1+\text{connection function})$ where connection function=$\Delta G/G_{ram}$=f(PPM parameters). One way for deriving the connection function is by setting the relative error $\Delta G/G_{raw}$ as the target of the multi-variate regression and the input parameters from the PPM parameters.

To summarize, in some embodiments, the R1, R4, or y45 PPM parameters may be used as part of a conversion function to convert raw current signal information to a raw or initial glucose value $G_{raw}$. Once $G_{raw}$ is known, a connection function may then be employed to compute a compensated or final glucose signal or concentration, $G_{comp}$. For example, the connection function may be derived from in vitro data using SS signals (i10) and NSS signals (PPM signals) as input parameters and relative error $\Delta G/G_{raw}$ as the target for multi-variate regression. An example connection function CF is provided below for parameter R4. It will be understood that other numbers and/or types of terms may be used.

CF=30.02672+3.593884*ni23−11.74152*R3−0.915224*z54+0.026557*GR41−0.061011*GR43+0.17876*Gy43+0.355556*R62R54−1.910667*R54R42−0.367626*R54R43−0.010501*GR43R31−4.92585*z61z63−48.9909*z63z32−22.97277*z64z42−2.566353*z64z43+69.93413*z65z52−75.5636*z65z32−16.28583*z52z32  .  .  .  +0.017588*Gy51y42+0.020281*Gy51y32−1.92665*R62z51−0.348193*R62z53−0.901927*R62z31+75.69296*R64z52−222.675*R65z52−29.05662*R65z53−142.145*R65z32+15.47396*R51z53+74.8836*R51z32+23.1061*R42z32+0.0018396*GR52z41+0.100615*GR31z32−8.89841*R61y52+1.873765*R61y42+2.459974*R61y43  .  .  .  +4.911592*z41y31−1.04261*z31y32−0.014889*Gz61y42+0.007133*Gz63y65+0.019989*Gz64y51+0.004536*Gz64y43−0.01605*Gz65y54+0.00011*Gz52y32+0.004775*Gz53y54−0.531827*d32−0.026387*Gd11−0.010296*Gd21+0.003426*Gd32−6.350168*d21d31+8.39652*d22d31−0.0329025*Gd11d31−0.039527*av1−2.342127*av1i10+0.550159*av3i10−4.87669*av14−0.139865*av16+14.59835*av25−9.31e−5*Gav3−0.000143*Gav4+0.001157*Gav16−0.022394*Gav25−0.000888*Gav26−0.928135*R30+2.307865*R50−4.501269*z60−7.491846*w65w51−3.56458*w65w53+7.147535*w43w32 . . . .

The input parameters for connection function CF may be the following types, for example.

Probing currents: The probing potential modulation currents i11, i12, i13, . . . , i61, i62, i63, wherein the first digit (x) of the ixy format denotes the potential step while the second digit (y) denotes which current measurement made after application of the potential step (e.g., the first, second or third measurement).

R parameters: These ratios are computed by the ending PPM current being divided by the first PPM current within one potential step. For example, R1=i13/i11, R2=i23/i21, R3=i33/i31, R4=i43/i41, R5=i53/i51, and R6=i63/i61.

X-type parameters: The general format for this type of parameter is given by the ending PPM current of a later potential step being divided by the ending PPM current of an earlier potential step. For example, parameter x61 is determined by i63/i13 where i63 is the ending PPM current of step 6 in the three recorded currents per step while i13 is the ending PPM current of step 1. Additionally, x61=i63/i13, x62=i63/i23, x63=i63/i33, x64=i63/i43, x65=i63/i53, x51=i53/i13, x52=i53/i23, x53=i53/i33, x54=i53/i43, x41=i43/i13, x42=i43/i23, x43=i43/i33, x31=i33/i13, x32=i33/i23, and x21=i23/i13.

Y-type parameters: The general format for this type of parameter is given by the ending PPM current of a later potential step being divided by the first PPM current of an earlier potential step. For example, parameter y61 is determined by i63/i11 where i63 is the ending PPM current of step 6 in the three recorded currents per step while i11 is the first PPM current of step 1. Additionally, y61=i63/i11, y62=i63/i21, y63=i63/i31, y64=i63/i41, y65=i63/i51, y51=i53/i11, y52=i53/i21, y53=i53/i31, y54=i53/i41, y41=i43/i11, y42=i43/i21, y43=i43/i31, y31=i33/i11, y32=i33/i21, and y21=i23/i11.

Z-type parameters: The general format for this type of parameter is given by the first PPM current of a later potential step being divided by the ending PPM current of an earlier potential step. For example, parameter z61 is determined by i61/i13 where i61 is the first PPM current of step 6 in the three recorded currents per step while i13 is the ending PPM current of step 1. Additionally, z61=i61/i13, z62=i61/i23, z63=i61/i33, z64=i61/i43, z65=i61/i53, z51=i51/i13, z52=i51/i23, z53=i51/i33, z54=i51/i43, z41=i41/i13, z42=i41/i23, z43=i41/i33, z31=i31/i13, z32=i31/i23, and z21=i21/i13.

Additional terms include normalized currents: ni11=i11/i10, ni12=i12/i10 . . . , relative differences: d11=(i11−i12)/i10, d12=(i12−i13)/i10 . . . , average currents of each PPM potential step av1=(i11+i12+i13)/3, av2=(i21, +i22, +i23)/3, . . . , and average current ratios av12=av1/av2, av23=av2/av3 . . . . Other miscellaneous terms include GR1=$G_{raw}$*R1, Gz61=$G_{raw}$*z61, Gy52=$G_{raw}$*y52 . . . , R63R51=R63/R51, R64R43=R64/R43 . . . , z64z42=z64/z42, z65z43=z65/z43 . . . , d11d31=d11/d31, d12d32=d12/d32 . . . , Gz61y52=G*z61/y52 . . . , etc.

Other types of parameters, such as the PPM current differences or relative differences carrying the equivalent or similar information, or the ratios of middle PPM currents, may also be used.

Thus, the extracted parameters R1, R4, and y45 can be used to indicate the raw glucose analyte concentration, and a connection function may be used with the raw glucose analyte concentration to connect in vitro to in vivo glucose. The results of compensation by the conversion function to $G_{raw}$ and the connection function to $G_{comp}$ are summarized in Table 600 of FIG. 6. The results show that R1, R4, and y45 may be used as the analyte indicating signal and are capable of converging the wide-spread responses to a narrow band of glucose values by a connection function.

Figure 4A:
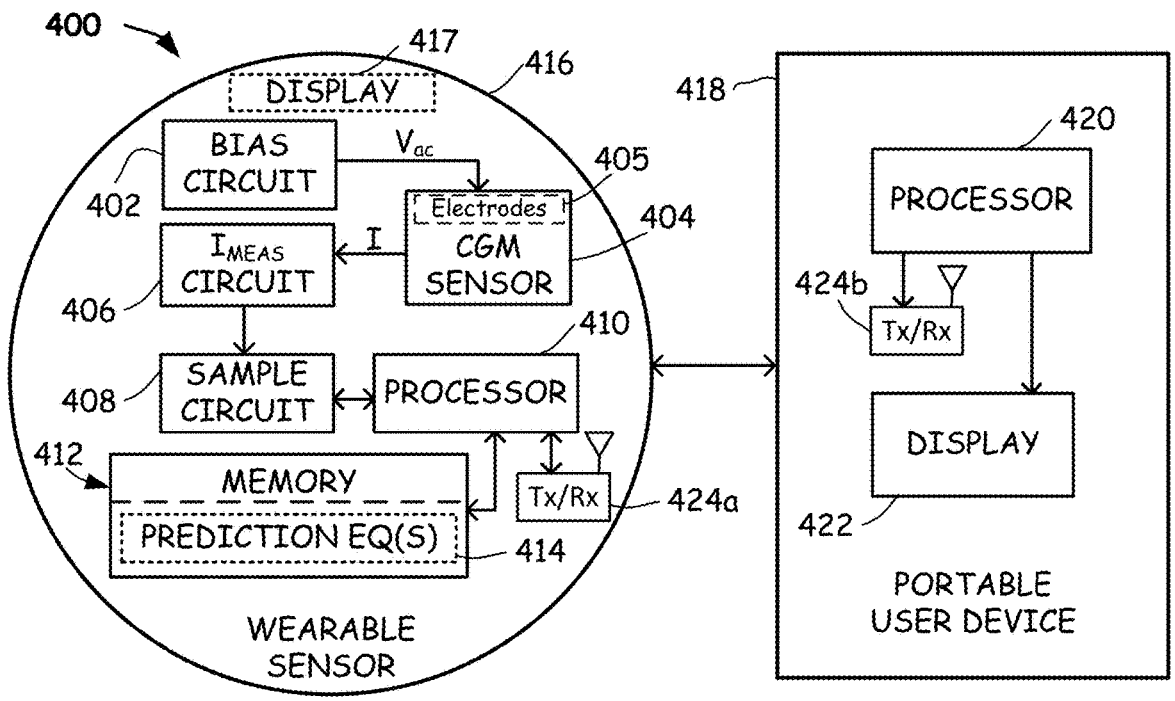
FIG. 4A illustrates a high-level block diagram of an example CGM device according to one or more embodiments of the disclosure.

FIG. 4A illustrates a high-level block diagram of an example CGM device 400 in accordance with embodiments provided herein. Although not shown in FIG. 4A, it is to be understood that the various electronic components and/or circuits are configured to couple to a power supply, such as but not limited to a battery. CGM device 400 includes a bias circuit 402 that may be configured to couple to a CGM sensor 404. Bias circuit 402 may be configured to apply a bias voltage, such as a continuous DC bias, to an analyte-containing fluid through CGM sensor 404. In this example embodiment, the analyte-containing fluid may be human interstitial fluid, and the bias voltage may be applied to one or more electrodes 405 of CGM sensor 404 (e.g., a working electrode, a background electrode, etc.).

Bias circuit 402 also may be configured to apply a PPM sequence, as shown in FIG. 1C, or another PPM sequence to CGM sensor 404. For example, PPM sequences may be applied initially and/or at intermediate time periods, or applied for each primary data point. PPM sequences may be applied before, after, or before and after measurement of a primary data point, for example.

In some embodiments, the CGM sensor 404 may include two electrodes and the bias voltage and probing potential modulations (PPMs) may be applied across the pair of electrodes. In such cases, current may be measured through the CGM sensor 404. In other embodiments, the CGM sensor 404 may include three electrodes such as a working electrode, a counter electrode, and a reference electrode. In such cases, the bias voltage and PPMs may be applied between the working electrode and the reference electrode, and current may be measured through the working electrode, for example. The CGM sensor 404 includes chemicals which react with a glucose-containing solution in a reduction-oxidation reaction, which affects the concentration of charge carriers and the time-dependent impedance of the CGM sensor 404. Example chemicals include glucose oxidase, glucose dehydrogenase, or the like. In some embodiments, a mediator such as ferricyanide or ferrocene may be employed.

The continuous bias voltage generated and/or applied by bias circuit 402 may range from about 0.1 to 1 volt versus the reference electrode, for example. Other bias voltages may be used. Example PPM values are described previously.

PPM currents and non-PPM (NPPM) currents through CGM sensor 404 in an analyte-containing fluid responsive to PPMs and a constant bias voltage may be conveyed from CGM sensor 404 to a current measurement ($I_{meas}$) circuit 406 (also referred to as current sensing circuitry). Current measurement circuit 406 may be configured to sense and/or record current measurement signals that have magnitudes indicative of the magnitudes of the currents conveyed from CGM sensor 404 (e.g., using a suitable current-to-voltage converter (CVC), for example). In some embodiments, current measurement circuit 406 may include a resistor having a known nominal value and a known nominal precision (e.g., 0.1% to 5%, or even smaller than 0.1%, in some embodiments), through which the current conveyed from CGM sensor 404 is passed. A voltage developed across the resistor of current measurement circuit 406 represents the magnitude of the current and may be referred to as the current measurement signal.

In some embodiments, a sample circuit 408 may be coupled to current measurement circuit 406 and may be configured to sample the current measurement signal. Sample circuit 408 may produce digitized time-domain sample data that is representative of the current measurement signal (e.g., digitized glucose signals). For example, sample circuit 408 may be any suitable A/D converter circuit configured to receive the current measurement signal, which is an analog signal, and convert it to a digital signal having a desired number of bits as an output. The number of bits output by sample circuit 408 may be sixteen in some embodiments, but more or fewer bits may be used in other embodiments. In some embodiments, sample circuit 408 may sample the current measurement signal at a sampling rate in the range of about 10 samples per second to 1000 samples per second. Faster or slower sampling rates may be used. For example, sampling rates such as about 10 kHz to 100 kHz may be used and down-sampled to further reduce signal-to-noise ratio. Any suitable sampling circuitry may be employed.

Still referring to FIG. 4A, a processor 410 may be coupled to sample circuit 408 and to a memory 412. In some embodiments, processor 410 and sample circuit 408 are configured to directly communicate with each other via a wired pathway (e.g., via a serial or parallel connection). In other embodiments, the coupling of processor 410 and sample circuit 408 may be by way of memory 412. In this arrangement, sample circuit 408 writes digital data to memory 412, and processor 410 reads the digital data from memory 412.

Memory 412 may have stored therein one or more prediction equations 414 for use in determining glucose values based on primary data points (NPPM currents) and PPM currents (from current measurement circuit 406 and/or sample circuit 408). In some cases, prediction equations may include conversion and/or connection functions. For example, in some embodiments, two or more prediction equations may be stored in memory 412, each for use with different segments (time periods) of CGM collected data. In some embodiments, memory 412 may include a prediction equation based on primary current signals generated by application of a constant voltage potential applied to a reference sensor, and a plurality of PPM current signals generated by application of a PPM sequence applied between primary current signal measurements.

Memory 412 also may have stored therein a plurality of instructions. In various embodiments, processor 410 may be a computational resource such as but not limited to a microprocessor, a microcontroller, an embedded microcontroller, a digital signal processor (DSP), a field programmable gate array (FPGA) configured to perform as a microcontroller, or the like.

In some embodiments, the plurality of instructions stored in memory 412 may include instructions that, when executed by the processor 410, cause the processor 410 to (a) cause the CGM device 400 (via bias circuit 402, CGM sensor 404, current measurement circuit 406, and/or sample circuit 408) to measure current signals (e.g., primary current signals and PPM current signals) from interstitial fluid; (b) store current signals in memory 412; (c) compute prediction equation parameters such as ratios (and/or other relationships) of currents from different voltage steps or other voltage changes within a PPM sequence; (d) employ computed prediction equation parameters to compute glucose values (e.g., concentrations) using prediction equations; and/or (e) communicate glucose values to a user.

Memory 412 may be any suitable type of memory, such as, but not limited to, one or more of a volatile memory and/or a non-volatile memory. Volatile memory may include, but is not limited to, a static random access memory (SRAM) or a dynamic random access memory (DRAM). Non-volatile memory may include, but is not limited to, an electrically programmable read-only memory (EPROM), an electrically erasable programmable read-only memory (EEPROM), a flash memory (e.g., a type of EEPROM in either of the NOR or NAND configurations, and/or in either the stacked or planar arrangements, and/or in either the single-level cell (SLC), multi-level cell (MLC), or combination SLC/MLC arrangements), a resistive memory, a filamentary memory, a metal oxide memory, a phase change memory (such as a chalcogenide memory), or a magnetic memory. Memory 412 may be packaged as a single chip or as multiple chips, for example. In some embodiments, memory 412 may be embedded, with one or more other circuits, in an integrated circuit, such as, for example, an application specific integrated circuit (ASIC).

As noted above, memory 412 may have a plurality of instructions stored therein that, when executed by processor 410, cause processor 410 to perform various actions specified by one or more of the stored plurality of instructions. Memory 412 may further have portions reserved for one or more "scratchpad" storage regions that may be used for read or write operations by processor 410 responsive to execution of one or more instructions of the plurality of instructions.

In the embodiment of FIG. 4A, bias circuit 402, CGM sensor 404, current measurement circuit 406, sample circuit 408, processor 410, and memory 412 including prediction equation(s) 414, may be disposed within a wearable sensor portion 416 of CGM device 400. In some embodiments, wearable sensor portion 416 may include a display 417 for displaying information such as glucose concentration information (e.g., without use of external equipment). Display 417 may be any suitable type of human-perceivable display, such as but not limited to, a liquid crystal display (LCD), a light-emitting diode (LED) display, or an organic light emitting diode (OLED) display.

Still referring to FIG. 4A, CGM device 400 may further include a portable user device portion 418. A processor 420 and a display 422 may be disposed within portable user device portion 418. Display 422 may be coupled to processor 420. Processor 420 may control the text or images shown by display 422. Wearable sensor portion 416, and portable user device portion 418, may be communicatively coupled. In some embodiments, the communicative coupling of wearable sensor portion 416, and portable user device portion 418, may be by way of wireless communication via transmitter circuitry and/or receiver circuitry, such as transmit/receive circuit TxRx 424a in wearable sensor portion 416 and transmit/receive circuit TxRx 424b in portable user device 418, for example. Such wireless communication may be by any suitable means including but not limited to standards-based communications protocols such as the Bluetooth® communications protocol. In various embodiments, wireless communication between wearable sensor portion 416, and portable user device portion 418, may alternatively be by way of near-field communication (NFC), radio frequency (RF) communication, infra-red (IR) communication, or optical communication. In some embodiments, wearable sensor portion 416 and portable user device portion 418 may be connected by one or more wires.

Display 422 may be any suitable type of human-perceivable display, such as but not limited to, a liquid crystal display (LCD), a light-emitting diode (LED) display, or an organic light emitting diode (OLED) display.

Figure 4B:
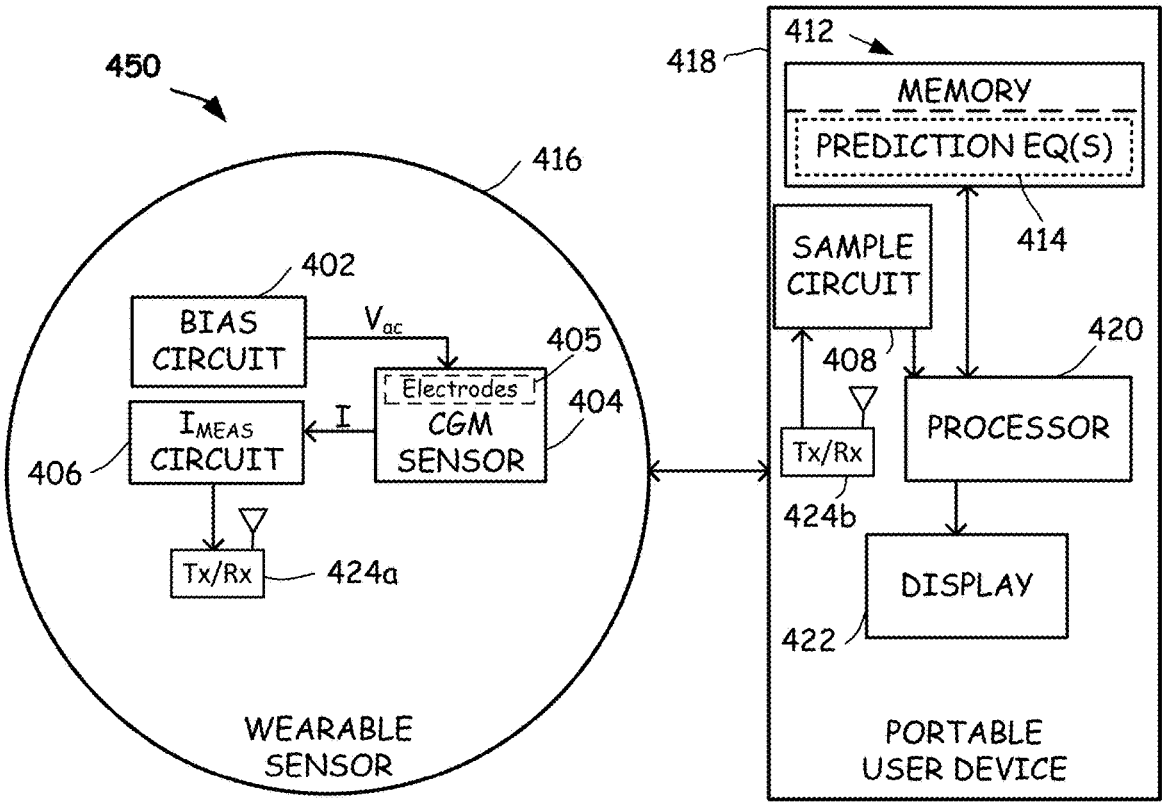
FIG. 4B illustrates a high-level block diagram of another example CGM device according to one or more embodiments of the disclosure.

Referring now to FIG. 4B, an example CGM device 450 is shown that is similar to the embodiment illustrated in FIG. 4A, but having a different partitioning of components. In CGM device 450, the wearable sensor portion 416 includes the bias circuit 402 coupled to the CGM sensor 404, and the current measurement circuit 406 coupled to the CGM sensor 404. The portable user device portion 418 of CGM device 450 includes the sample circuit 408 coupled to processor 420, and the display 422 coupled to processor 420. Processor 420 is further coupled to memory 412 that may include prediction equation(s) 414 stored therein. In some embodiments, processor 420 in CGM device 450 may also perform the previously-described functions performed by processor 410 of CGM device 400 of FIG. 4A, for example. Wearable sensor portion 416 of CGM device 450 may be smaller and lighter, and therefore less invasive, than CGM device 400 of FIG. 4A because sample circuit 408, processor 410, memory 412, etc., are not included therein. Other component configurations may be employed. For example, as a variation to the CGM device 450 of FIG. 4B, sample circuit 408 may remain on wearable sensor portion 416 (such that portable user device 418 receives digitized glucose signals from wearable sensor portion 416).

Figure 5:
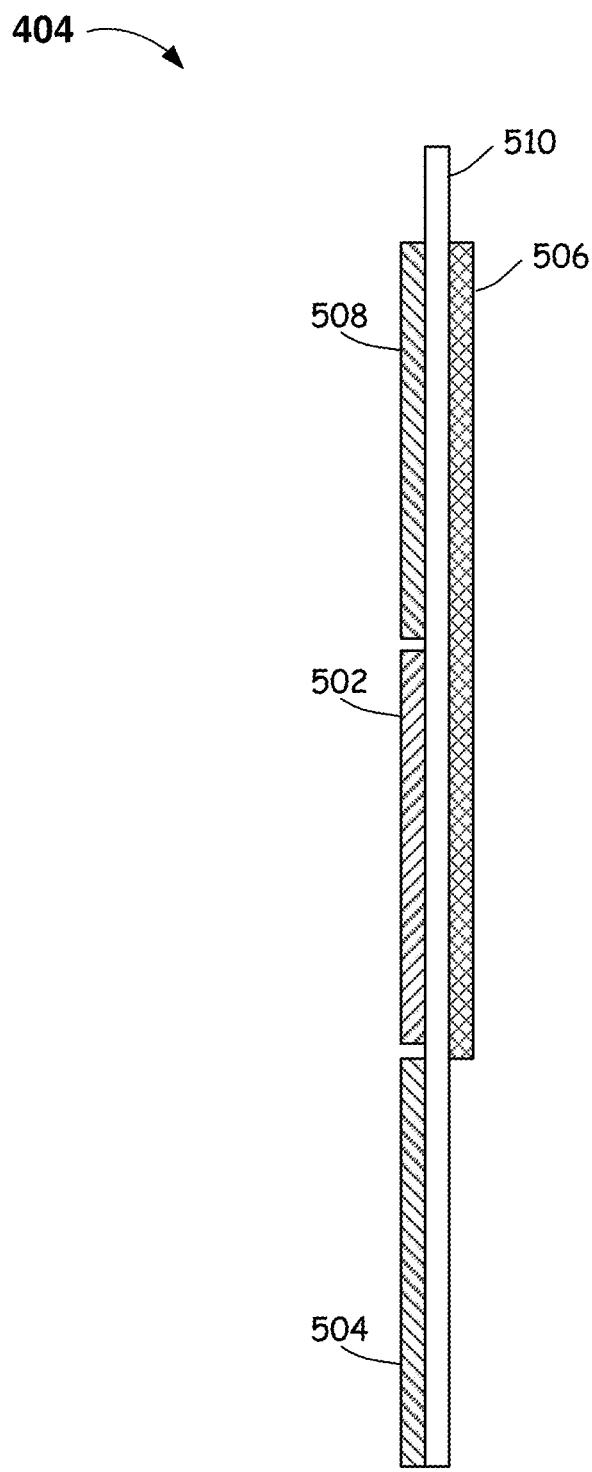
FIG. 5 is a side schematic view of an example glucose sensor according to one or more embodiments of the disclosure.

FIG. 5 is a side schematic view of an example glucose sensor 404 in accordance with embodiments provided herein. In some embodiments, glucose sensor 404 may include a working electrode 502, a reference electrode 504, a counter electrode 506 and a background electrode 508. The working electrode may include a conductive layer coated with a chemical which reacts with a glucose-containing solution in a reduction-oxidation reaction (which affects the concentration of charge carriers and the time-dependent impedance of the CGM sensor 404). In some embodiments, the working electrode may be formed from platinum or surface roughened platinum. Other working electrode materials may be used. Example chemical catalysts (e.g., enzymes) for the working electrode 502 include glucose oxidase, glucose dehydrogenase, or the like. The enzyme component may be immobilized onto the electrode surface by a cross-linking agent such as glutaraldehyde, for example. An outer membrane layer may be applied onto the enzyme layer to protect the overall inner components including the electrode and the enzyme layer. In some embodiments, a mediator such as ferricyanide or ferrocene may be employed. Other chemical catalysts and/or mediators may be employed.

In some embodiments, reference electrode 504 may be formed from Ag/AgCl. The counter electrode 506 and/or the background electrode 508 may be formed a suitable conductor such as platinum, gold, palladium, or the like. Other materials may be used for the reference, counter and/or background electrodes. In some embodiments, the background electrode 508 may be identical to the working electrode 502, but without the chemical catalyst and mediator. Counter electrode 506 may be isolated from the other electrodes by an isolation layer 510 (e.g., polyimide or another suitable material).

Figure 7:
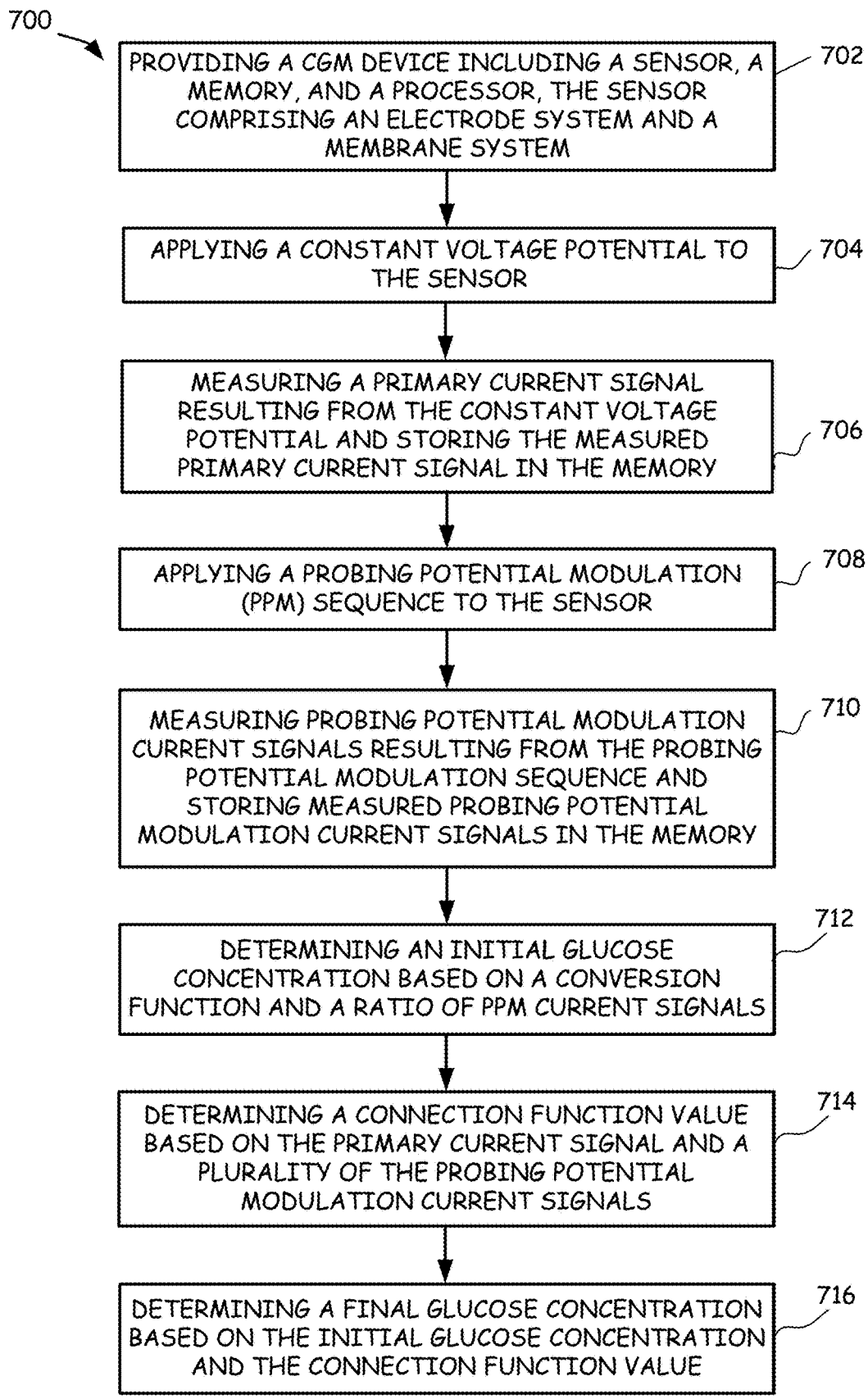
FIG. 7 illustrates an example method of determining glucose values during continuous glucose monitoring measurements, in accordance with embodiments provided herein.

FIG. 7 illustrates an example method 700 of determining glucose values during continuous glucose monitoring measurements in accordance with embodiments provided herein. Method 700 includes, in Block 702, providing a CGM device including a sensor, a memory, and a processor (e.g., CGM device 400 or 450 of FIGS. 4A and 4B), wherein the sensor comprises an electrode system and a membrane system encompassing the electrode system, and the membrane system comprises an analyte permeable membrane having an analyte permeability with lower analyte solubility than an analyte solubility outside the membrane.

Method 700 also includes, in Block 704, applying a constant voltage potential to the sensor (e.g., $E_0$ in FIG. 1A). In Block 706, method 700 includes measuring a primary current signal resulting from the constant voltage potential and storing the measured primary current signal in the memory. In Block 708, method 700 includes applying a probing potential modulation sequence to the sensor (e.g., the PPM sequence of FIG. 1C). In Block 710, method 700 includes measuring probing potential modulation current signals resulting from the probing potential modulation sequence and storing measured probing potential modulation current signals in the memory. Method 700 further includes: in Block 712, determining an initial glucose concentration based on a conversion function and a plurality of the measured probing potential modulation current signals; in Block 714, determining a connection function value based on the primary current signal and a plurality of the probing potential modulation current signals; and in Block 716, determining a final glucose concentration based on the initial glucose concentration and the connection function value. The final glucose concentration may be communicated to a user (e.g., via display 417 or 422 of FIG. 4A or 4B).

Note that some embodiments, or portions thereof, may be provided as a computer program product or software that may include a machine-readable medium having non-transient instructions stored thereon, which may be used to program a computer system, controller, or other electronic device to perform a process in accordance with one or more embodiments.

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure or the claims.

What is claimed is:

1. A biosensor system configured to establish a steady-state condition and alternate between the steady-state condition and a non-steady-state condition to determine a final glucose concentration, the biosensor system comprising:
    an electrode system having at least one working electrode covered with an analyte catalyzing layer for converting an analyte into a measurable species;
    a membrane system encompassing the electrode system and comprising an analyte permeable membrane configured to trap the measurable species within the analyte permeable membrane, thereby establishing the steady-state condition;
    a bias circuit configured to periodically apply a probing potential modulation sequence to the at least one working electrode to establish the non-steady-state condition within the electrode system;
    at least one processor; and
    one or more non-transitory computer-readable media containing computer-executable instructions that, when executed by the at least one processor, cause the at least one processor to perform a method of determining glucose values during continuous glucose monitoring, the method comprising:
        establishing the steady-state condition by applying, by the bias circuit, a constant voltage potential to the electrode system,
        wherein applying the constant voltage potential fully oxidizes the measurable species;
        measuring, using the at least one working electrode, a primary current signal resulting from the constant voltage potential,
        wherein the primary current signal is indicative of a first analyte concentration;

storing information indicative of the primary current signal on the one or more non-transitory computer-readable media;

determining a steady-state analyte concentration based upon the information indicative of the primary current signal;

periodically establishing the non-steady-state condition by applying, by the bias circuit, the probing potential modulation sequence to the electrode system, wherein the non-steady-state condition involves an accumulation of the measurable species at and proximate a surface of the at least one working electrode, wherein the non-steady-state condition exists when a concentration gradient of the measurable species at the surface is non-zero, wherein applying the probing potential modulation sequence comprises applying a first voltage potential greater than the constant voltage potential, applying a second voltage potential less than the constant voltage potential, applying a third voltage potential less than the second voltage potential, applying a fourth voltage potential greater than the third voltage potential, and applying a fifth voltage potential greater than the fourth voltage potential, wherein applying the second voltage potential and the third voltage potential of the probing potential modulation sequence decreases oxidation of the measurable species;

measuring, while the electrode system is in the non-steady-state condition and using the at least one working electrode, a plurality of probing potential modulation current signals resulting from the non-steady-state condition;

determining a plurality of ratio parameters from the plurality of probing potential modulation current signals, wherein the plurality of ratio parameters comprises a ratio of a last current signal measured during the fourth voltage potential to a first current signal measured during the fifth voltage potential;

determining a non-steady-state analyte concentration based upon the plurality of ratio parameters;

determining an initial glucose concentration based on the steady-state analyte concentration;

determining, using relative error as a target for multivariate regression, a connection function based on the steady-state analyte concentration and the non-steady-state analyte concentration, wherein the relative error is associated with the initial glucose concentration; and determining the final glucose concentration based on the initial glucose concentration and the connection function.

2. The biosensor system of claim 1, wherein the analyte permeable membrane has a dry thickness ranging from 5 um to 15 um.

3. The biosensor system of claim 1, wherein the analyte permeable membrane has a stable thickness ranging from 30 um to 60 um in response to subcutaneous insertion of the biosensor system into skin.

4. The biosensor system of claim 1, wherein the analyte catalyzing layer has a dry thickness ranging from 1 um to 3 um.

5. The biosensor system of claim 1, wherein a thickness ratio of the analyte catalyzing layer to the analyte permeable membrane is 1:10 in response to subcutaneous insertion of the biosensor system into skin.

6. The biosensor system of claim 1, wherein the probing potential modulation sequence has a duration of 10% to 20% of a primary data point cycle, wherein a primary data point comprises at least one of the plurality of probing potential modulation current signals.

7. The biosensor system of claim 6, wherein the primary data point cycle ranges from 3 minutes to 15 minutes.

8. The biosensor system of claim 1,
wherein the ratio of the last current signal measured during the fourth voltage potential to the first current signal measured during the fifth voltage potential is a first ratio,
wherein the plurality of ratio parameters further comprises a second ratio of a last current signal measured during the first voltage potential to a first current signal measured during the first voltage potential.

9. The biosensor system of claim 1,
wherein the ratio of the last current signal measured during the fourth voltage potential to the first current signal measured during the fifth voltage potential is a first ratio,
wherein the plurality of ratio parameters further comprises a second ratio of the last current signal measured during the fourth voltage potential to a first current signal measured during the fourth voltage potential.

10. A biosensor system configured to establish a steady-state condition and alternate between the steady-state condition and a non-steady-state condition to determine a final glucose concentration, the biosensor system comprising:

an electrode system having at least one working electrode covered with an analyte catalyzing layer for converting an analyte into a measurable species;

a membrane system encompassing the electrode system and comprising an analyte permeable membrane configured to trap the measurable species within the analyte permeable membrane, thereby establishing the steady-state condition;

a bias circuit configured to periodically apply a probing potential modulation sequence to the at least one working electrode to establish the non-steady-state condition within the electrode system;

at least one processor, and one or more non-transitory computer-readable media containing computer-executable instructions that, when executed by the at least one processor, cause the at least one processor to perform a method of determining glucose values during continuous glucose monitoring, the method comprising:

establishing the steady-state condition by applying, by the bias circuit, a constant voltage potential to the electrode system, wherein applying the constant voltage potential fully oxidizes the measurable species;

measuring, using the at least one working electrode, a primary current signal resulting from the constant voltage potential, wherein the primary current signal is indicative of a first analyte concentration;

periodically establishing the non-steady-state condition by applying, by the bias circuit, the probing potential modulation sequence to the electrode system, thereby resulting in an accumulation of the measurable species at and proximate a surface of the at least one working electrode, wherein applying the probing potential modulation sequence comprises applying a first voltage potential greater than the constant voltage potential, applying a second voltage potential less than the constant voltage potential, applying a third voltage potential less than the second voltage potential, and applying a fourth voltage potential greater than the third voltage potential, wherein applying the second voltage potential and the third voltage potential of the probing potential modulation sequence decreases oxidation of the measurable species;

measuring, while the electrode system is in the non-steady-state condition and using the at least one working electrode, a plurality of probing potential modulation current signals resulting from the non-steady-state condition, wherein the plurality of probing potential modulation current signals is indicative of at least a second analyte concentration;

determining a plurality of ratio parameters from the plurality of probing potential modulation current signals, wherein the plurality of ratio parameters comprises a ratio of a last current signal measured during the fourth voltage potential to a first current signal measured during the fourth voltage potential;

determining an initial glucose concentration based upon the plurality of ratio parameters and the primary current signal;

determining a connection function based on the initial glucose concentration and the plurality of probing potential modulation current signals; and determining the final glucose concentration based on the initial glucose concentration and the connection function.

11. A biosensor system configured to establish a steady-state condition and alternate between the steady-state condition and a non-steady-state condition to determine a final glucose concentration, the biosensor system comprising:

an electrode system having at least one working electrode covered with an analyte catalyzing layer for converting an analyte into a measurable species;

a membrane system encompassing the electrode system and comprising an analyte permeable membrane configured to trap the measurable species within the analyte permeable membrane, thereby establishing the steady-state condition;

a bias circuit configured to periodically apply a probing potential modulation sequence to the at least one working electrode to establish the non-steady-state condition within the electrode system;

at least one processor; and one or more non-transitory computer-readable media containing computer-executable instructions that, when executed by the at least one processor, cause the at least one processor to perform a method of determining glucose values during continuous glucose monitoring, the method comprising:

establishing the steady-state condition by applying, by the bias circuit, a constant voltage potential to the electrode system, wherein applying the constant voltage potential fully oxidizes the measurable species;

measuring, using the at least one working electrode, a primary current signal resulting from the constant voltage potential, wherein the primary current signal is indicative of a first analyte concentration;

periodically establishing the non-steady-state condition by applying, by the bias circuit, the probing potential modulation sequence to the electrode system, wherein applying the probing potential modulation sequence comprises applying a first voltage potential greater than the constant voltage potential at a first time, applying a second voltage potential less than the constant voltage potential at a second time, and applying a third voltage potential less than the second voltage potential at a third time, wherein applying the second voltage potential and the third voltage potential causes the measurable species to accumulate at and proximate a surface of the at least one working electrode, wherein applying the second voltage potential and the third voltage potential of the probing potential modulation sequence decreases oxidation of the measurable species;

measuring, while the electrode system is in the non-steady-state condition and using the at least one working electrode, a plurality of probing potential modulation current signals resulting from the non-steady-state condition, wherein the plurality of probing potential modulation current signals is indicative of a plurality of analyte concentrations;

determining a plurality of ratio parameters from the plurality of probing potential modulation current signals, wherein the plurality of ratio parameters comprises a ratio of a last current signal measured during the first voltage potential to a first current signal measured during the first voltage potential;

determining an initial glucose concentration based upon the plurality of ratio parameters and the primary current signal;

determining a connection function based on the initial glucose concentration and the plurality of probing potential modulation current signals; and determining the final glucose concentration based on the initial glucose concentration and the connection function.

12. The biosensor system of claim 11, wherein the probing potential modulation sequence has a duration of 10% to 20% of a primary data point cycle.

13. The biosensor system of claim 12, wherein the duration of the probing potential modulation sequence is within a range of 10 seconds to 40 seconds.

14. The biosensor system of claim 11, wherein each voltage potential of the probing potential modulation sequence is applied for a time within a range of 1 second to 15 seconds.

15. The biosensor system of claim 11, wherein applying the probing potential modulation sequence further includes applying a fourth voltage potential greater than the third voltage potential at a fourth time and applying a fifth voltage potential greater than the fourth voltage potential at a fifth time, wherein the ratio of the last current signal measured during the first voltage potential to the first current signal measured during the first voltage potential is a first ratio, wherein the plurality of ratio parameters further comprises a second ratio of a last current signal measured during the fourth voltage potential to a first current signal measured during the fifth voltage potential.

16. The biosensor system of claim 10,
wherein applying the probing potential modulation sequence further includes applying a fifth voltage potential greater than the fourth voltage potential,
wherein the ratio of the last current signal measured during the fourth voltage potential to the first current signal measured during the fourth voltage potential is a first ratio,
wherein the plurality of ratio parameters further comprises a second ratio of the last current signal measured during the fourth voltage potential to a first current signal measured during the fifth voltage potential.

17. The biosensor system of claim 16, wherein applying the second voltage potential and the third voltage potential causes the accumulation of the measurable species at and proximate the surface of the at least one working electrode.

18. The biosensor system of claim 16, wherein the electrode system further comprises:
a reference electrode,
wherein the constant voltage potential and the probing potential modulation sequence are applied between the at least one working electrode and the reference electrode.

19. The biosensor system of claim 18, wherein the electrode system further comprises:
a counter electrode; and
an isolation layer configured to isolate the counter electrode from the at least one working electrode and the reference electrode.

20. The biosensor system of claim 19, the electrode system further comprises a background electrode without the analyte catalyzing layer.

\* \* \* \* \*